United States Patent
Honda et al.

(10) Patent No.: US 9,903,443 B2
(45) Date of Patent: Feb. 27, 2018

(54) ECCENTRIC SPEED VARIATOR

(71) Applicant: DENSO CORPORATION, Kariya, Aichi pref. (JP)

(72) Inventors: Yukihiro Honda, Kariya (JP); Hiroshi Okada, Kariya (JP); Akinori Kuwayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/599,015

(22) Filed: May 18, 2017

(65) Prior Publication Data
US 2017/0335925 A1  Nov. 23, 2017

(30) Foreign Application Priority Data
May 20, 2016  (JP) .................................. 2016-101154

(51) Int. Cl.
*F16H 1/32* (2006.01)
*B60K 17/04* (2006.01)

(52) U.S. Cl.
CPC ............. *F16H 1/32* (2013.01); *B60K 17/046* (2013.01)

(58) Field of Classification Search
CPC ................................ F16H 1/32; B60K 17/046
See application file for complete search history.

(56) References Cited

U.S. PATENT DOCUMENTS

| 6,220,107 B1 | 4/2001 | Wang | |
| 8,235,856 B2 * | 8/2012 | Nakamura | B25J 9/102 475/168 |
| 9,528,401 B2 * | 12/2016 | Otsubo | F01L 1/352 |
| 2007/0202981 A1 | 8/2007 | Sugiura et al. | |
| 2010/0107788 A1 * | 5/2010 | Heichel | B06B 1/166 74/61 |
| 2013/0117920 A1 * | 5/2013 | Nishimura | A47K 13/305 4/237 |
| 2014/0031165 A1 * | 1/2014 | Kubota | F16H 1/28 475/331 |

FOREIGN PATENT DOCUMENTS

| JP | 2009-257493 A | 11/2009 |
| JP | 2013-194869 A | 9/2013 |
| JP | 2013-221571 A | 10/2013 |
| JP | 2014-025511 A | 2/2014 |
| JP | 2017-141752 A | 8/2017 |

* cited by examiner

*Primary Examiner* — David J Hlavka
(74) *Attorney, Agent, or Firm* — Oliff PLC

(57) ABSTRACT

An eccentric speed variator includes a first rotor, a second rotor, a third rotor, a cylindrical pin, and a flange. The second rotor has a hole formed therein. The third rotor rotates eccentrically to change a relative rotation phase between the first and second rotors. The cylindrical pin extends through the hole of the second rotor to establish mechanical engagement between the second and third rotors. The flange is secured to or integrally formed with an end of the cylindrical pin. In operation, when the flange contacts the outside wall of the second rotor, it serves to minimize inclination of the third rotor relative to the second rotor, thereby reducing local friction between the second and third rotors to eliminate undesirable mechanical vibration or noise. This structure also enables parts of the cycloidal speed reducer to be decreased, which leads to a reduced size of the cycloidal speed reducer.

13 Claims, 34 Drawing Sheets

ECCENTRIC SPEED VARIATOR

CROSS REFERENCE TO RELATED DOCUMENT

The present application claims the benefit of priority of Japanese Patent Application No. 2016-101154 filed on May 20, 2016, the disclosure of which is incorporated herein by reference.

BACKGROUND

1 Technical Field

This disclosure relates generally to an eccentric speed variator which may be used with a variable valve timing mechanism for automotive vehicles.

2 Background Art

Japanese Patent First Publication No. 2009-257493 discloses a cycloidal speed reducer which has two rotors which are disposed in a rotatable housing and eccentrically rotate 180° out of phase from one another. The use of the two rotors leads to a rise of mechanical vibration or noise. In order to alleviate such a problem, Japanese Patent First Publication No. 2000-120809 teaches use of three rotors in a rotatable housing in a cycloidal speed reducer.

The use of the three rotors, however, results in an increased length or increased number of parts of the cycloidal speed reducer, which leads to an increased production cost thereof. In order to save the production cost, the number of the rotors used may be decreased to reduce the size or the number of parts making up the cycloidal speed reducer. In case of use of the two rotors, the rotors undergo a couple of forces, which may result in misalignment of axes of the rotors, thus causing the mechanical vibration or noise.

SUMMARY

It is therefore an object to provide an eccentric speed variator which has a structure capable of being reduced in size and minimizing undesirable mechanical vibration or noise.

According to one aspect of the disclosure, there is provided an eccentric speed variator which comprises, a first rotor, a second rotor, a third rotor, an engaging member, and a flange.

The second rotor is disposed in the first rotor and has at least one hole formed therein.

The third rotor is disposed in the first rotor and faces the second rotor. The third rotor joins the first rotor and the second rotor together so as to transmit rotation therebetween. The third rotor rotates about a rotation axis which is eccentric with respect to a rotation axis of the first to rotor to change a relative rotation phase between the first rotor and the second rotor and to accelerate or decelerate the first rotor or the second rotor.

The engaging member establishes mechanical engagement between the second rotor and the third rotor through the hole of the second rotor. The engaging member extends from the third rotor to have a first end farther away from the third rotor.

The flange is secured to or integrally formed with the first end of the engaging member and extends at least partially outside the hole of the second rotor in a radial direction of the second rotor so as to at least partially overlap an outer wall of the second rotor. When contacting the outer wall of the second rotor, the flange serves to minimize inclination of the third rotor relative to the second rotor.

When the flange contacts the outer wall of the second rotor, it produces force to attract the second and third rotor to each other, thereby minimizing the inclination of the third rotor relative to the second rotor. This reduces local mechanical friction between the second rotor and the third rotor to eliminate the risk of mechanical vibration or noise. This structure enables the eccentric speed variator to be decreased in size without need for increasing parts or production cost thereof.

According to another aspect of the disclosure, there is provided an eccentric speed variator which comprises, a first rotor, a second rotor, a third rotor, an engaging member, and a flange.

The first rotor has at least one through-hole formed therein.

The second rotor is disposed in the first rotor and has at least one hole formed therein.

The third rotor is disposed in the first rotor and faces the second rotor. The third rotor joins the first rotor and the second rotor together so as to transmit rotation therebetween. The third rotor rotates about a rotation axis which is eccentric with respect to a rotation axis of the first rotor to change a relative rotation phase between the first rotor and the second rotor and to accelerate or decelerate the first rotor or the second rotor.

The engaging member establishes mechanical engagement between the second rotor and the third rotor through the through-hole of the first rotor and the hole of the second rotor. The engaging member extends from the third rotor to have a first end farther away from the third rotor.

The flange is secured to or integrally formed with the first end of the engaging member and extends at least partially outside the hole of the second rotor in a radial direction of the second rotor so as to at least partially overlap an outer wall of the second rotor. When contacting the outer wall of the second rotor, the flange serves to minimize inclination of the third rotor relative to the second rotor.

The above structure also offers the same advantages as described above, that is, reduces local mechanical friction between the second rotor and the third rotor to eliminate the risk of the mechanical vibration or noise and also enables the eccentric speed variator to be decreased in size without need for increasing parts or production cost thereof.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Eccentric speed variators according to embodiments will be described below in detail with reference to the drawings. Throughout the drawings, the same reference numbers will refer to the same parts. The eccentric speed variators, as referred to in this disclosure, are implemented by a cycloidal speed reducer (also called a cycloidal drive) used with a variable valve timing mechanism working to alter open or close timing of an intake or an exhaust valve installed on an internal combustion engine in the following embodiments.

Figure 1:
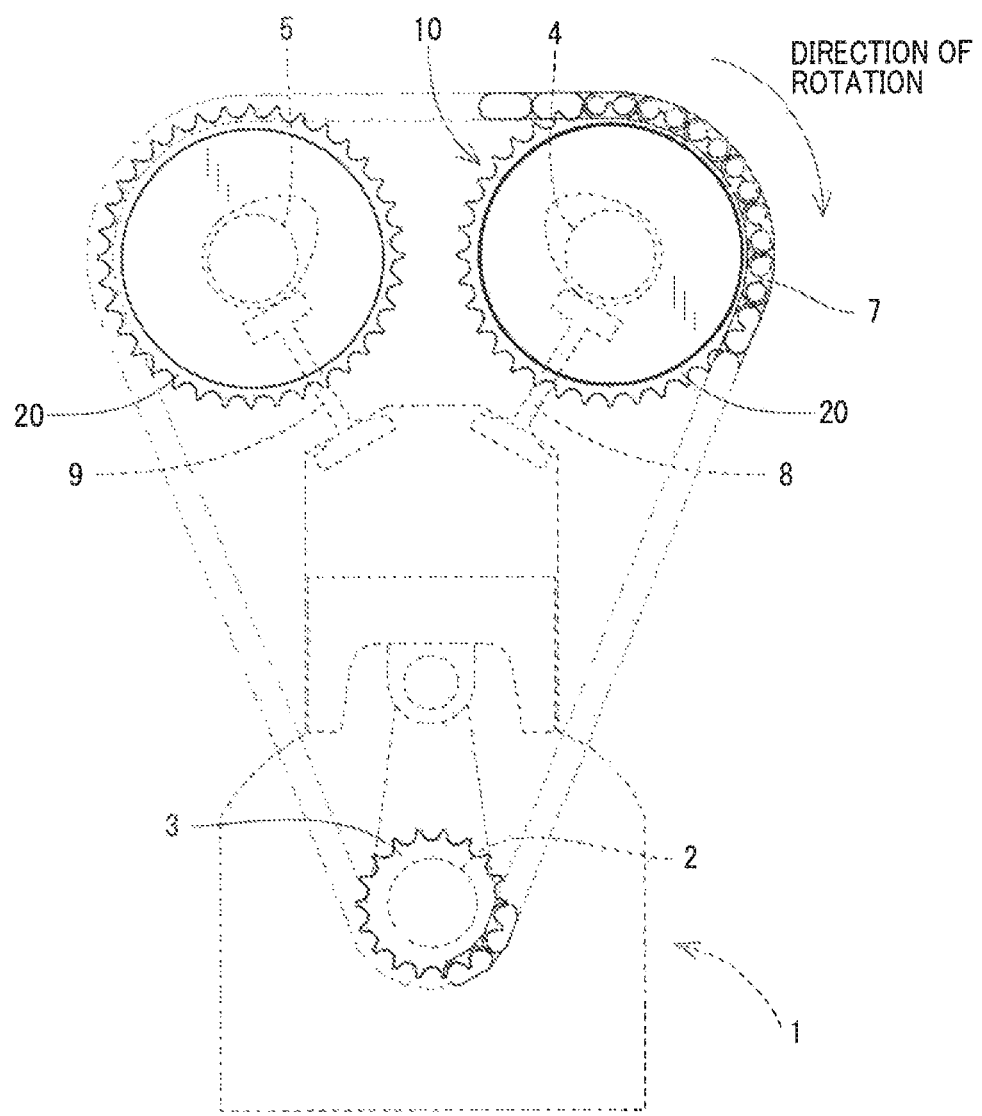
FIG. 1 is a schematic view which illustrates an eccentric speed variator designed as a cycloidal speed reducer according to the first embodiment which is used with a variable valve timing mechanism.

FIG. 1 illustrates the variable valve timing mechanisms 10 used with the cycloidal speed reducers 151 which will be described in detail in the following embodiments. The variable valve timing mechanisms 10 are provided one for each of the camshaft 4 and the camshaft 5.

The internal combustion engine 1 has the chain 7 wound around the crankshaft gear 3 and the first rotors sprocket units) 20 of the cycloidal speed reducers 151.

The crankshaft gear 3 is mounted on the crankshaft 2 which works as a drive shaft of the internal combustion engine 1.

The first rotors 20 of the cycloidal speed reducers 151 are mounted on the crankshafts 4 and 5 which serve as driven shafts.

Torque Tc is transmitted from the crankshaft 2 to the camshafts 4 and 5 through the chain 7. The camshaft 4 works to drive the intake valve 8, while the camshaft 5 drives the exhaust valve 9.

The variable valve timing mechanisms 10 are engineered to alter a relative rotation phase between the crankshaft 2 and the camshaft 4 and between the crankshaft 2 and the camshaft 5 to control the timing of opening or closing the intake valve 8 and the exhaust valve 9.

The cycloidal speed reducers 151 are used in this embodiment to alter the relative rotation phase between the crankshaft 2 and the camshaft 4 and between the crankshaft 2 and the camshaft 5.

Each of the variable valve timing mechanisms 10 works to rotate a corresponding one of the camshafts 4 and 5 in the same direction as the crankshaft 2 relative to the first rotor 20 which rotates together with the crankshaft 2, thereby advancing the timing of opening or closing of the intake valve 8 or the exhaust valve 9 (which will also be referred to below as a valve timing). The relative rotation of the camshaft 4 or 5 to the first rotor 20 to advance the valve timing of the intake valve 8 or the exhaust valve 9 is usually referred to as valve advancement.

Each of the variable valve timing mechanism 10 also works to rotate a corresponding one of the camshafts 4 and 5 in a direction opposite that in which the crankshaft 2 rotates so as to create a relative rotation to the first rotor 20, thereby retarding the valve timing of the intake valve 8 or the exhaust valve 9. The relative rotation of the crankshaft 4 or 5 to retard the valve timing of the intake valve 8 or the exhaust valve 9 is usually referred to as valve retard.

First Embodiment

Figure 2:
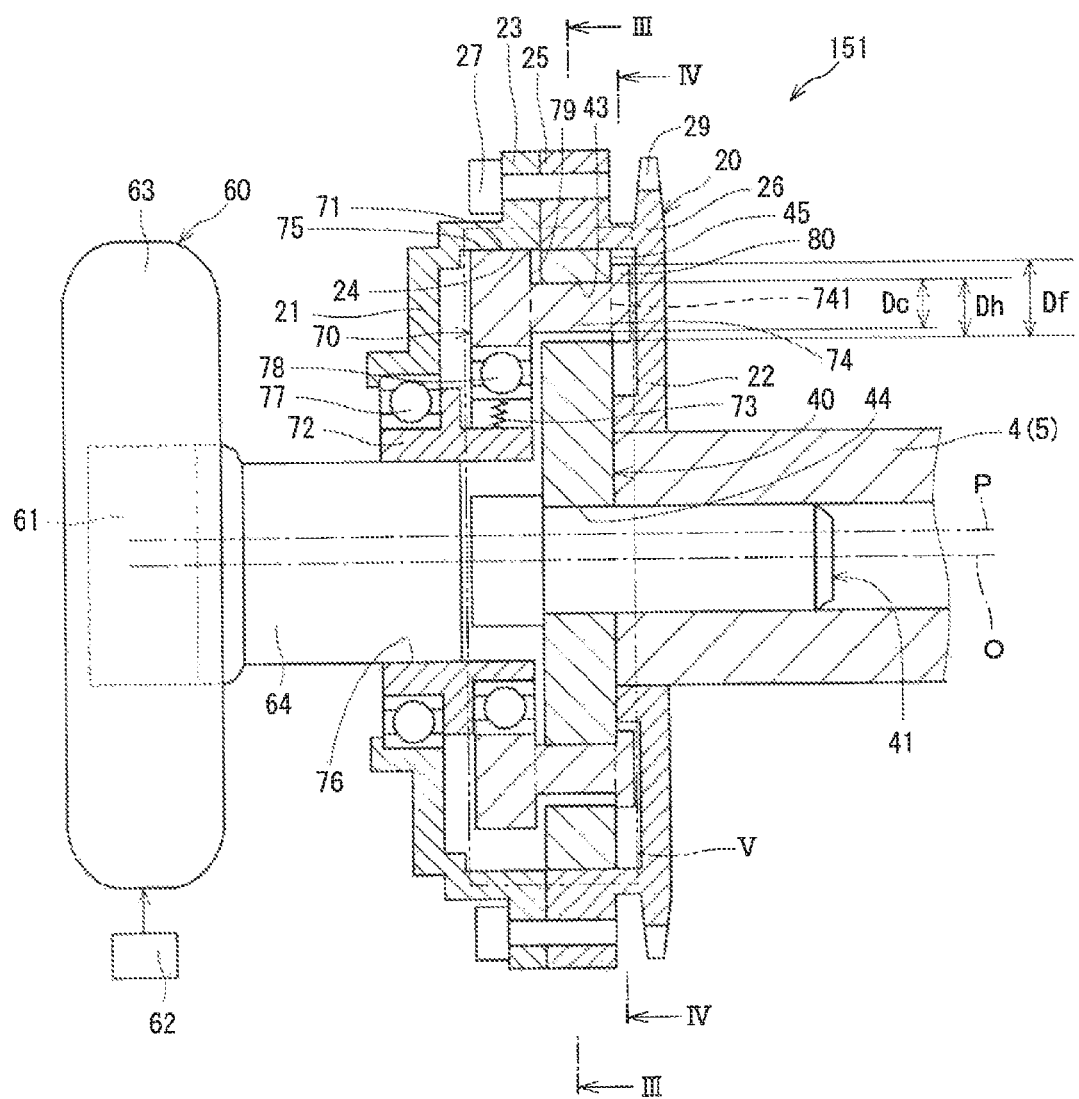
FIG. 2 is a longitudinal sectional view which illustrates a cycloidal speed reducer according to the first embodiment.

Each of the cycloidal speed reducer 151 is, as illustrated in FIG. 2, equipped with the first rotor 20, the second rotor 40, the control unit 60, and the third rotor 70.

The first rotor 20 is of a box shape including the bottomed cylindrical gear member 21 and the bottomed cylindrical sprocket 22 which are arranged coaxially with each other. The first rotor 20 has an inner chamber formed therein and is rotatable.

The first rotor 20 is mounted coaxially with the camshaft 4 or camshaft 5.

The gear member 21 is equipped with the protrusion 23 and the first internal gear 24.

The protrusion 23 is formed on the gear member 21 and extends outwardly from an outer periphery of the gear member 21 in a radial direction of the gear member 21.

The first internal gear 24 is formed on the inner peripheral wall of the gear member 21. The first internal gear 24 has teeth whose tops face the radial center of the gear member 21. The first internal gear 24, as referred to in this disclosure, is designed to have a cycloidal tooth profile, but may be engineered to have another type of gear profile, for example, involute tooth profile.

The sprocket 22 includes the large-diameter portion 25 and the small-diameter portion 26.

The large-diameter portion 25 is joined to the protrusion 23 using the screws 27 to connect the gear member 21 and the sprocket 22 together as an assembly.

The small-diameter portion 26 has formed thereon a plurality of teeth (which will also be referred to below as sprocket teeth) 29 extending outwardly in the radial direction thereof. The chain 7 is wound around the teeth 29 input of torque Tc, as outputted from the crankshaft 2, to the sprocket 22 through the chain 7 will cause the first rotors 20 to rotate about the rotation axis O along with the crankshaft 2 in a clockwise direction, as viewed in FIG. 1.

The second rotor 40 is disposed in the first rotors 20. The second rotor 40 is of a disc shape (which will also be called a planet wheel) and has formed in the center thereof the center hole 44 through which the sleeve bolt 41 is inserted. The second rotor 40 is oriented coaxially with the first rotor 20 and firmly held or gripped between the head of the sleeve bolt 41 and the camshaft 4 or 5, thereby establishing a joint between the second rotor 40 and the camshaft 4 or 5.

The second rotor 40 has a fixed phase with the camshaft 4 or 5 and is rotatable about the rotation axis O synchronously with the camshaft 4 or 5. The second rotor 40 is retained inside the large-diameter portion 25 to be rotatable relative to the first rotor 20.

Figure 3:
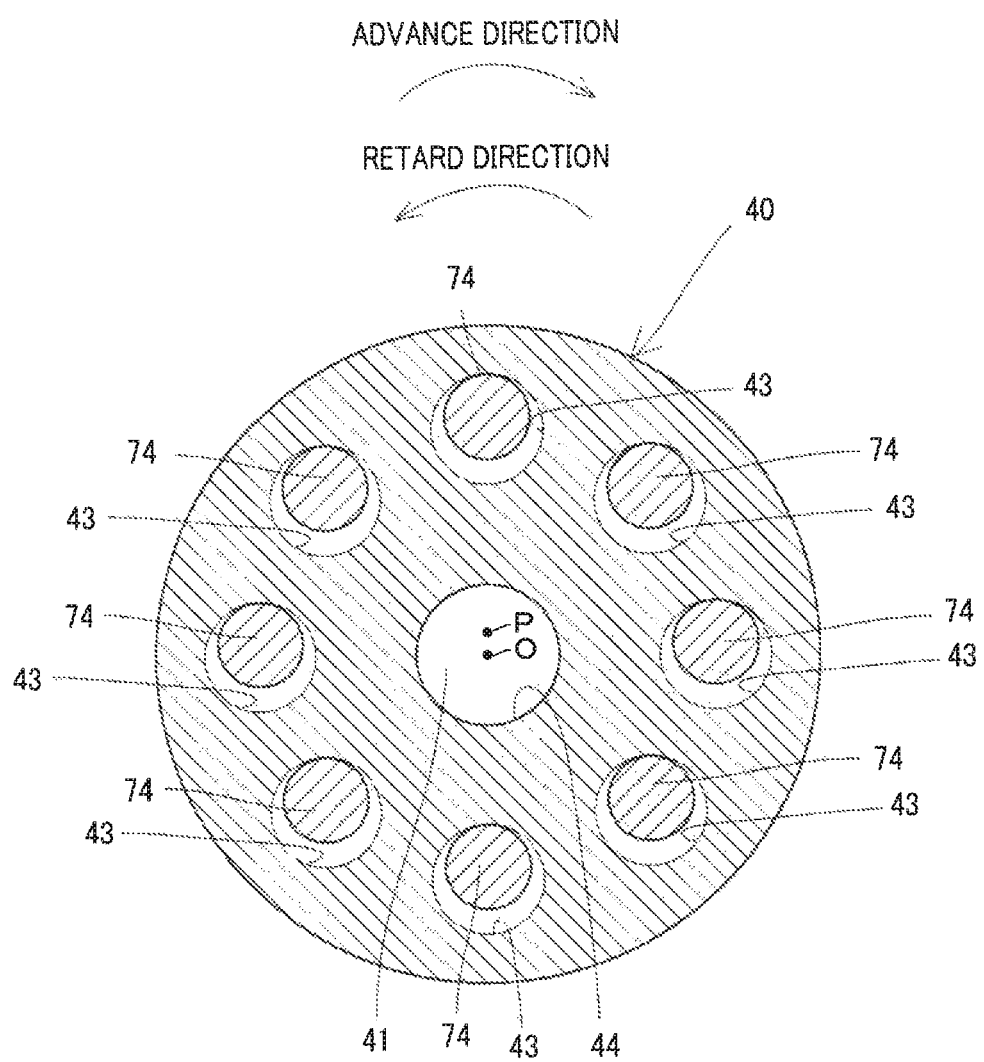
FIG. 3 is a transverse sectional view, as taken along the line III-III in FIG. 2, which illustrates a second rotor and cylindrical pines engaging the second rotor of the cycloidal speed reducer of FIG. 2.

The second rotor 40 has formed therein a plurality of holes 43 which have the same diameter. The holes 43 are, as can be seen in FIG. 3, circular in transverse section thereof. In this embodiment, the second rotor 40 has the eight holes 42 arranged away from each other in a circumferential direction thereof.

The control unit 60 is made up of the electric motor 61 and the control circuit 62.

The electric motor 61 is, for example, a permanent magnet synchronous three-phase AC motor and disposed on the opposite side of the first and second rotors 20 and 40 to a corresponding one of the camshafts 4 and 5. The electric motor 61 is mounted in the motor casing 63 and has the motor shaft 64. The motor shaft 64 is retained by the motor casing 63 to be selectively rotatable in normal and reverse directions.

The control circuit 62 is mainly implemented by a typical microcomputer and located outside or inside the motor casing 63. An operation of the control circuit 62 may be established in a software form by executing in a CPU logical programs stored in a memory device, such as a ROM. The control circuit 62 may be designed to have a hardware structure made of electronic circuits.

The control circuit 62 is connected to the electric motor 61 and works to control an operation of the electric motor 61 as a function of an operating condition of the internal combustion engine 1. The electric motor 61 generates a rotating magnetic field around the motor shaft 64 and outputs from the motor shaft 64 torque Tm in one of an advance direction X and a retard direction Y which is selected by a direction of the rotating magnetic field.

The third rotor 70 is disposed in the first rotor 20 and faces the second rotor 40. The third rotor 70 is of a cylindrical shape and coupled with the motor shaft 64. The third rotor 70 is rotatable about the rotation axis O along with the motor shaft 64. The third rotor 70 is equipped with the third external gear 71, the eccentric cylinder 72, the spring (i.e., a biasing member) 73, and cylindrical pins 74.

The third external gear 71 is formed on an outer peripheral wall of the third rotor 70. The third external gear 71 has teeth whose tops face outwardly in the radial direction of the third external gear 71. The third external gear 71, as referred to in this disclosure, is designed to have a cycloidal tooth profile, but may be engineered to have another type of gear profile, for example, an involute tooth profile. The number of the teeth of the third external gear 71 is selected to be smaller than that of the first internal gear 24. The outer peripheral wall of the third external gear 71 engages the inner peripheral wall of the first internal gear 24. With these arrangements, the third rotor 70 is retained to be rotatable relative to the first rotor 20. A portion of the third external gear 71 and a portion of the first internal gear 24 which engage with each other will also be referred to as a meshed portion 75.

The eccentric cylinder 72 is hollow cylindrical and has an outer peripheral wall which is eccentric with respect to the rotation axis O toward the meshed portion 75. The eccentric cylinder 72 has formed therein the center hole 76 into which the motor shaft 64 is inserted.

The eccentric cylinder 72 retains the gear member 21 through the bearing 77 outside the center hole 76 and also retains the third external gear 71 through the bearing 78 outside the center hole 76.

With the above arrangements, the third rotor 70 is rotatable about the eccentric axis P that is the center axis of the outer peripheral wall of the eccentric cylinder 72 and also orbitable around the rotation axis O. The third rotor 70, therefore, moves in a planetary motion, that is, rotates eccentrically with respect to the rotation axis O of the first rotor 20 and the second rotor 40.

The eccentric rotation of the third rotor 70 results in a change in relative rotation phase between the first rotor 20 and the second rotor 40 to accelerate or decelerate the first rotor 20 or the second rotor 40.

The spring 73 is disposed between the eccentric cylinder 72 and the bearing 78 close to the meshed portion 75. The spring 73 radially urges the third rotor 70 through the bearing 78 to create the meshed portion 75, thereby pressing the third rotor 70 against the gear member 21 and also pressing the cylindrical pins 74, which will be described later in detail, against the second rotor 40.

The third rotor 70 has the eight cylindrical pins 74 formed integrally therewith. The cylindrical pins 74 extend from the third rotor end surface 79 that is one of opposed major surfaces of the third rotors 70 toward the second rotor 40.

The cylindrical pines 74 are arranged in a circle so that any three of them are located in misalignment with each other.

Each of the cylindrical pins 74 is disposed in one of the holes 43 of the second rotor 40 with an outer surface of the cylindrical pin 74 placed in contact or engagement with an inner surface of the hole 43. In other words, each of the cylindrical pins 74 works as an engaging member to establish mechanical engagement between the second rotor 40 and the third rotor 70.

The cylindrical pin 74, as can be seen in FIG. 3, partially engages the hole 43 with a gap between the outer periphery of the cylindrical pin 74 and the inner periphery of the hole 43, thereby achieving engagement of the second rotor 40 and the third rotor 70.

Operation

The operation of the cycloidal speed reducer 151 will be described below.

When the motor shaft 64 of the electric motor 61 is placed not to rotate relative to the first rotor 20, in other words, when it is not required to alter the valve timing, the third rotor 70 rotates together with the first rotor 20 and the second rotor 40 with the mesh between the third rotor 70 and the first rotor 20 fixed. The relative rotation phase between the first rotor 20 and the second rotor 40 is kept as it is, so that the valve timing remains unchanged.

When it is required for the electric motor 61 to rotate the motor shaft 64 relative to the first rotor 20 in the advance direction X, the electric motor 61 outputs the torque Tm from the motor shaft 64 in the advance direction X. This causes the third rotor 70 to move in a planetary motion which changes the location of the mesh between the third rotor 70 and the first rotor 20, thereby rotating the second rotor 40 relative to the first rotor 20 in the regard direction Y. This decelerates the second rotor 40 to retard the valve timing of a corresponding one of the intake valve 8 and the exhaust valve 9.

When it is required for the electric motor 61 to rotate the motor shaft 64 to output the torque Tm in the retard direction Y or the electric motor 61 is suddenly stopped, the third rotor 70 moves in a planetary motion which changes the location of the mesh between the third rotor 70 and the first rotor 20, thereby rotating the second rotor 40 relative to the first rotor 20 in the advance direction X. This accelerates the second rotor 40 to advance the valve timing of a corresponding one of the intake valve 8 and the exhaust valve 9.

In the above way, the third rotor 70 connects the first rotor 20 and the second rotor 40 together so as to achieve transmission of rotation or torque therebetween. The planetary motion of the third rotor 70 changes the relative rotation phase between the first rotor 20 and the second rotor 40, which accelerates the rotation of the second rotor 40, thereby changing the valve timing of the intake valve 8 or the exhaust valve 9.

In the conventional structure in which the second rotor and the third rotor are disposed in the first rotor, the second and third rotors undergo a couple of forces, which may result in misalignment of axes of the second and third rotors, that is, the second and third rotors becoming non-parallel. The planetary motion of the third rotor when the second rotor is not parallel to the third rotor will cause the second and third rotors to partially contact each other, thus leading to mechanical friction therebetween. Such friction usually generates undesirable mechanical vibration or mechanical noise. A structure, like in the above described Japanese Patent First Publication No. 2000-120809, in which three rotors are disposed in the first rotor may be used to minimize the mechanical vibration or noise, but it results in increased parts of the structure or increased production costs thereof.

The cycloidal speed reducer 151 of this embodiment is, therefore, designed to minimize the mechanical vibration or noise without increasing parts thereof. Structural features of the cycloidal speed reducer 151 will be described below in detail.

Structural Feature

The cycloidal speed reducer 151 is equipped with flanges 80. Each of the cylindrical pins 74 has a given length and extends from the third rotor 70 to have the end 741 farther away from the third rotor 70. Each of the flanges 80 is joined, welded, or screwed to the end 741 of one of the cylindrical pins 74. The ends 741 will also be referred to below as first ends. Each of the flanges 80 extends outward from one of the cylindrical pins 71 in a radial direction of the cylindrical pins 74. In other words, each of the flanges 80 extends at least partially outside the hole 43 of the second rotor 40 in the radial direction of the second rotor 40 so as to at least partially overlap the outer wall 45 of the second rotor 40 in the axial direction of the second rotor 40 (i.e., the cycloidal speed reducer 151). This is achieved by selecting a maximum dimension of at least a portion of each of the flanges 80 in the radial direction of the second rotor 40 to be greater than a maximum diameter of at least a portion of a corresponding one of the holes 43 of the second rotor 40. Each of the flanges 80 is placed to be contactable with the outer wall 45 of the second rotor 40 at least during operation of the cycloidal speed reducer 151. The cycloidal speed reducer 151 may have at least one flange 80.

Figure 4:
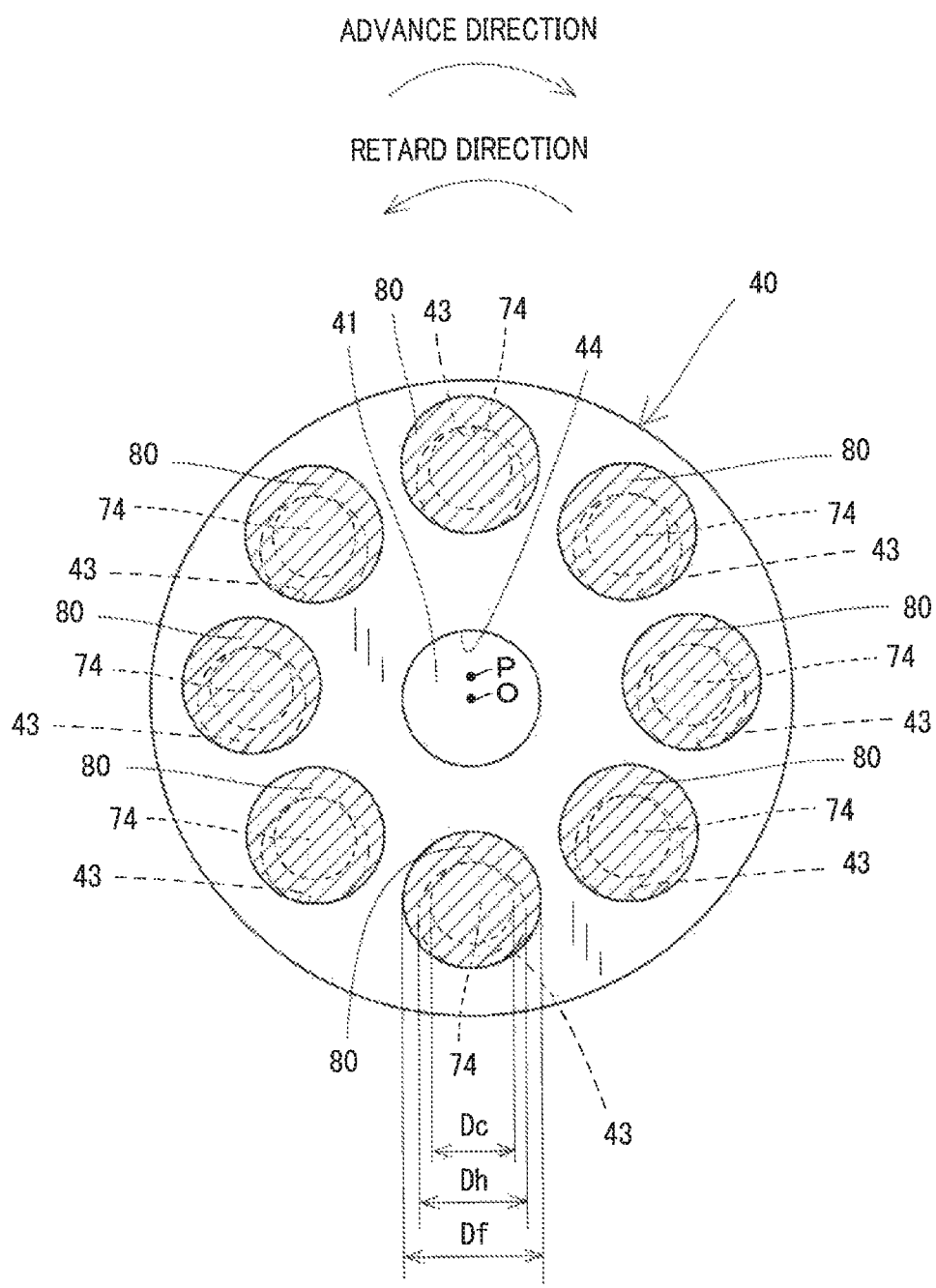
FIG. 4 is a sectional view, as taken along the line IV-IV in FIG. 2.

Each of the flanges 80 is, as can be seen in FIG. 4, circular in transverse cross section. In the example of FIG. 4, all the eight cylindrical pins 74 have the flanges 80 secured thereto. In this embodiment, the diameter of the holes 43 is defined as Dh, the diameter of the flanges 80 is defined as Df and the diameter of the cylindrical pins 74 is defined as Dc. The end surface of each of the flanges 80 closer to the second rotor 40 is referred to below as the flange end surface 81.

The cylindrical pins 74 are designed to have the diameter Dc smaller than the diameter Dh (i.e., Dh>Dc).

The flanges 80 are designed to have the diameter Df greater than the diameter Dh (i.e., Df>Dh).

In the following discussion, the longitudinal center line or center axis of the second rotor 40 is defined as C2. The center axis of the third rotor 70 is defined as C3. The angle which the center axis C2 makes with the center axis C3 is defined as a tilt angle θ. In this embodiment, the center axis C2 coincides with the rotation axis O. The center axis C3 coincides with the eccentric axis P.

Figure 34:
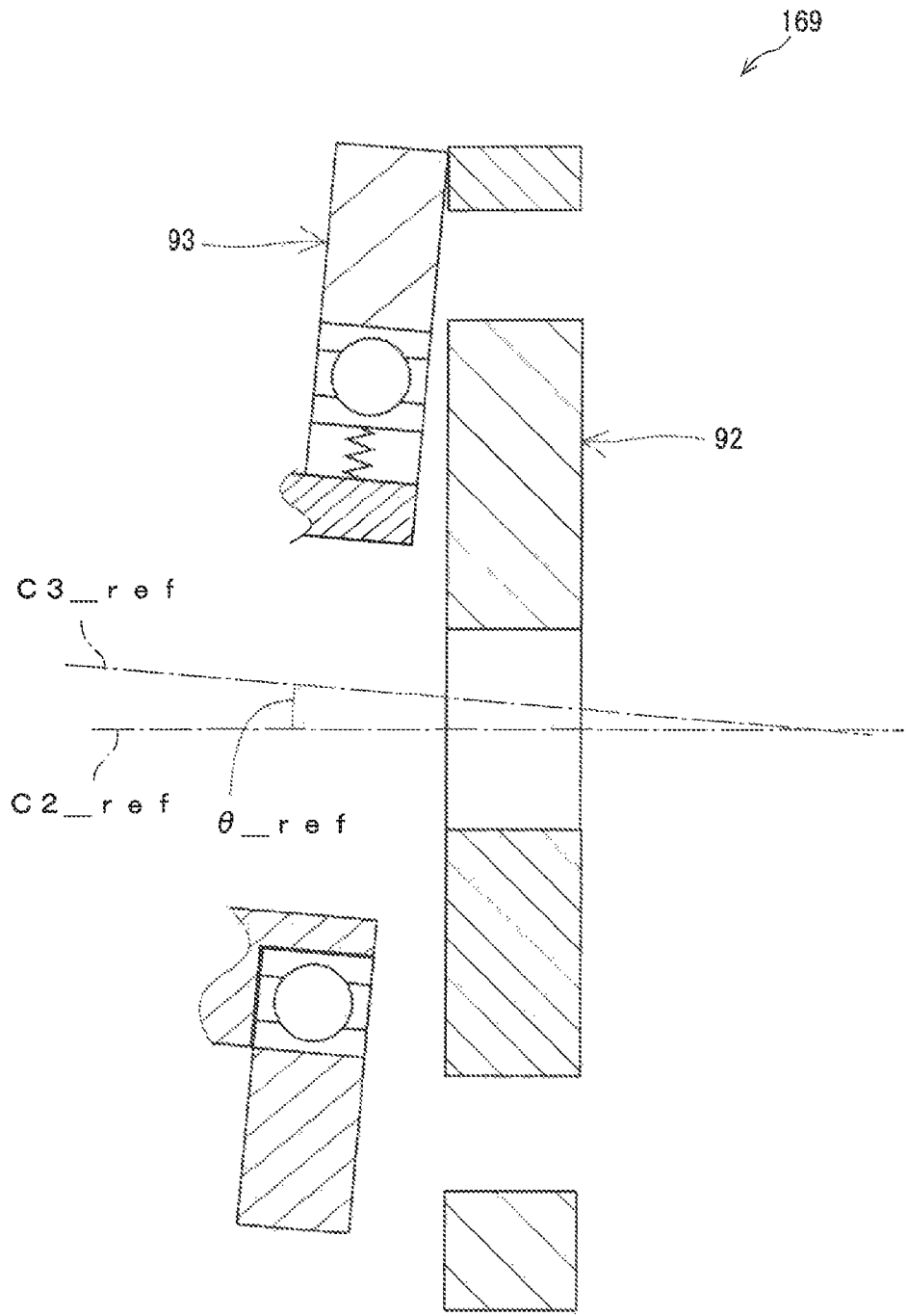
FIG. 34 is a partially sectional view which illustrates a comparative example of a cycloidal speed reducer.

FIG. 34 illustrates, as a comparative example, a cycloidal speed reducer 169 which is not equipped with the flanges 80. The cycloidal speed reducer 169 is equipped with the second rotor 92 and the third rotor 93. The second rotor 92 has the center axis C2_ref. The third rotor 93 has the center axis C3_ref. The angle which the center axis C2_ref makes with the center axis C3_ref is defined as a titling angle θ_ref.

When the third rotor 93 of the cycloidal speed reducer 169 moves, as illustrated in FIG. 34, in a planetary motion, it may cause the third rotor 93 to be inclined relative to the second rotor 92, which results in an increase in tilt angle θ_ref, thus leading to mechanical vibration or noise. FIG. 34 overdraws the tilt angle θ_ref in order to visually clarify an angular relation between the second rotor 92 and the third rotor 93.

Figure 5:
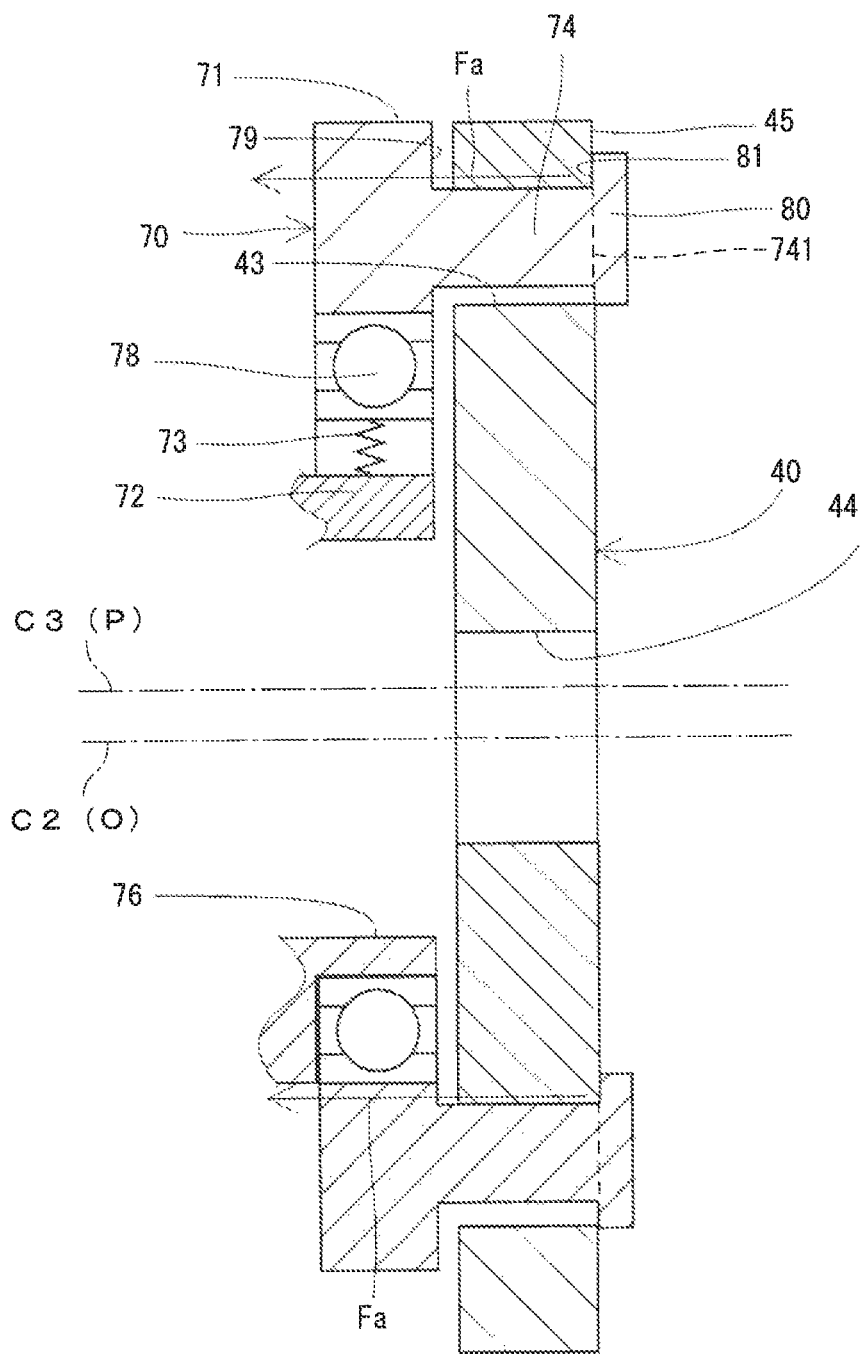
FIG. 5 is an enlarged view, as enclosed by a broke line V in FIG. 2.

Referring to FIG. 5, when the flange end surface 81 contacts the outer wall 45 of the second rotor 40 during operation of the cycloidal speed reducer 151, it exerts force Fa on the second rotor 40 to pull the second rotor 40 toward the third rotor 70. The force Fa serves to avoid inclination of the third rotor 70 relative to the second rotor 40, thereby keeping the tilt angle θ at zero. FIG. 5 does not show the tilt angle θ because it is zero.

Beneficial Effects

The physical contact of the flange end surface 81 with the outer wall 45 of the second rotor 40, as described above, minimizes or eliminates the inclination of the third rotor 70 relative to the second rotor 40. The stability of planetary motion of the third rotor 70 is, therefore, achieved without local physical contact with the second rotor 40, thereby minimizing the mechanical vibration or noise which usually arises from friction between the second rotor 40 and the third rotor 70 and also eliminating the need for three or more rotors disposed in the first rotor 20, which enables the cycloidal speed reducer 151 to be reduced in size.

Second Embodiment

Figure 6:
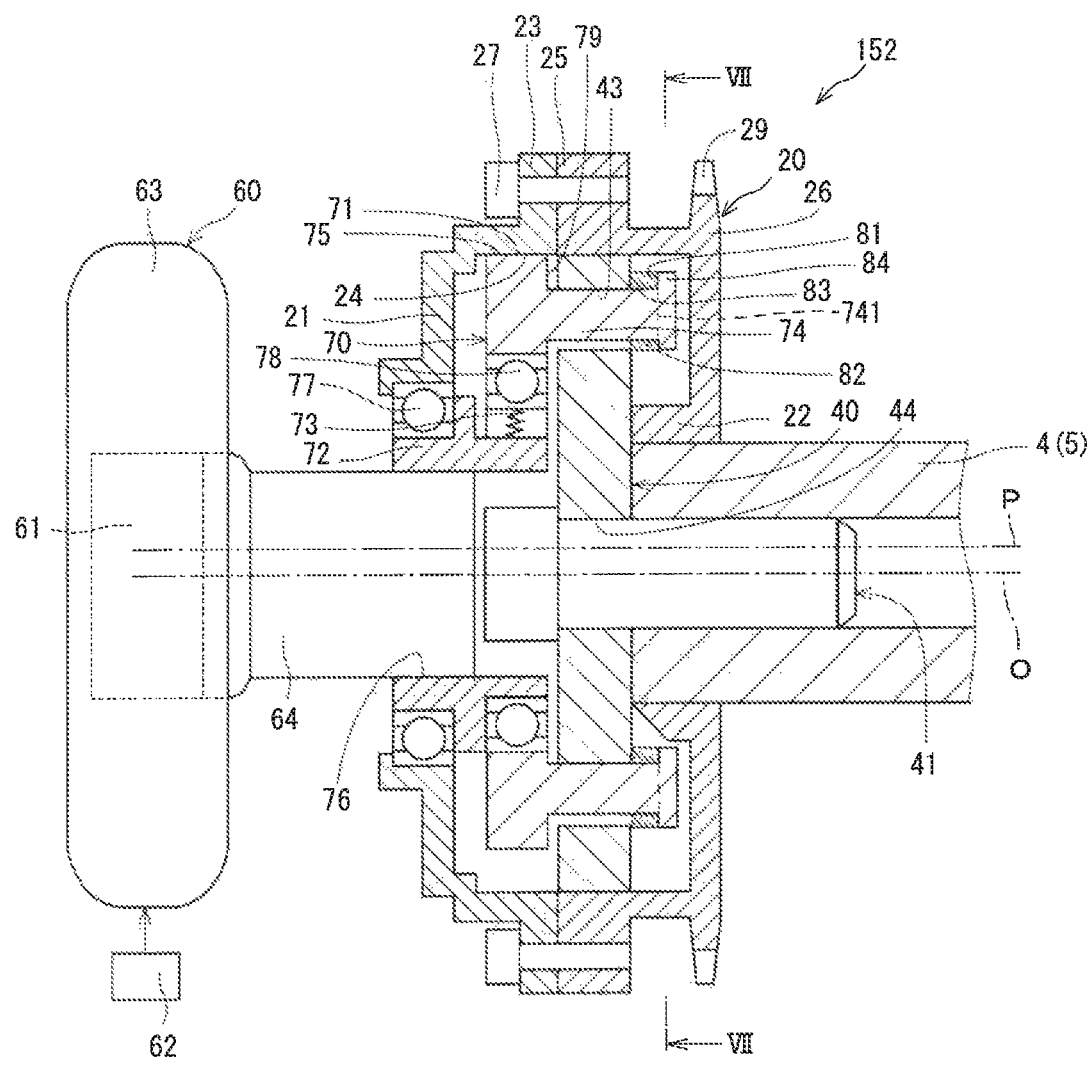
FIG. 6 is a longitudinal sectional view which illustrates a cycloidal speed reducer according to the second embodiment.

FIG. 6 illustrates the cycloidal speed reducer 152 according to the second embodiment which has the intermediate member 82 disposed between the second rotor 40 and the flanges 84. The intermediate member 82 is of a plate shape. Other arrangements are identical with those in the first embodiment.

Figure 7:
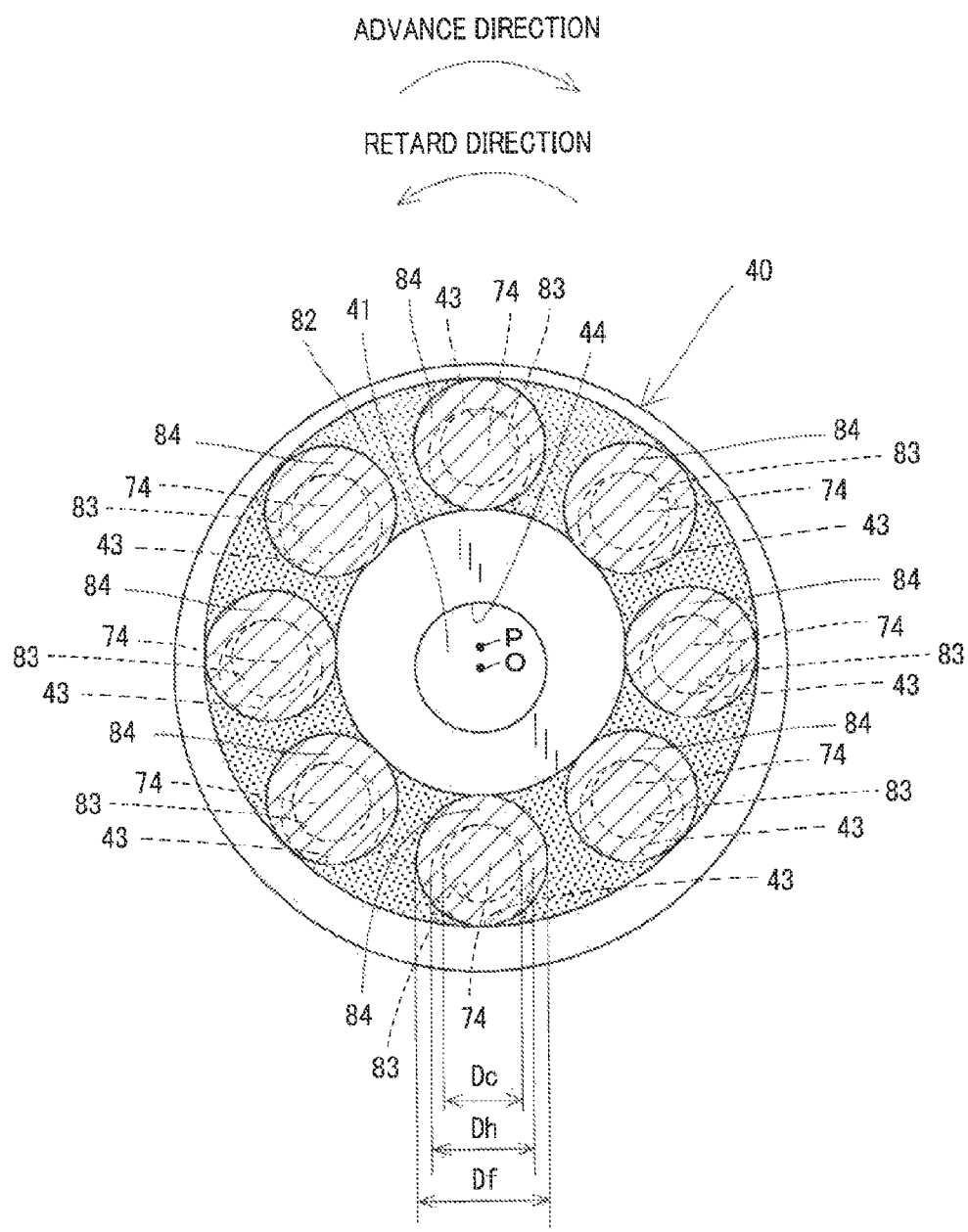
FIG. 7 is a transverse sectional view, as taken along the line VII-VII in FIG. 6, which illustrates a second rotor and cylindrical pines engaging the second rotor of the cycloidal speed reducer of FIG. 6.

Specifically, the intermediate member 82 is, as illustrated in FIG. 7, made of an annular disc and has formed therein eight through-holes 83 which are aligned or coincide with the holes 43 and through which the cylindrical pins 74 pass. The through-holes 83 are identical in configuration with the cylindrical pins 74. The term "identical with" or "equal to" means within usual tolerances and errors. FIG. 7 illustrates the intermediate member 82 using dots in order to facilitate visual perception thereof.

Referring back to FIG. 6, when the flange end surface 81 contacts the intermediate member 82, the flanges 84 work in the same way as in the first embodiment. The use of the intermediate member 82 increases the degree of stiffness of the flanges 84, thus minimizing the elastic deformation of the flanges 84.

Third Embodiment

Figure 8:
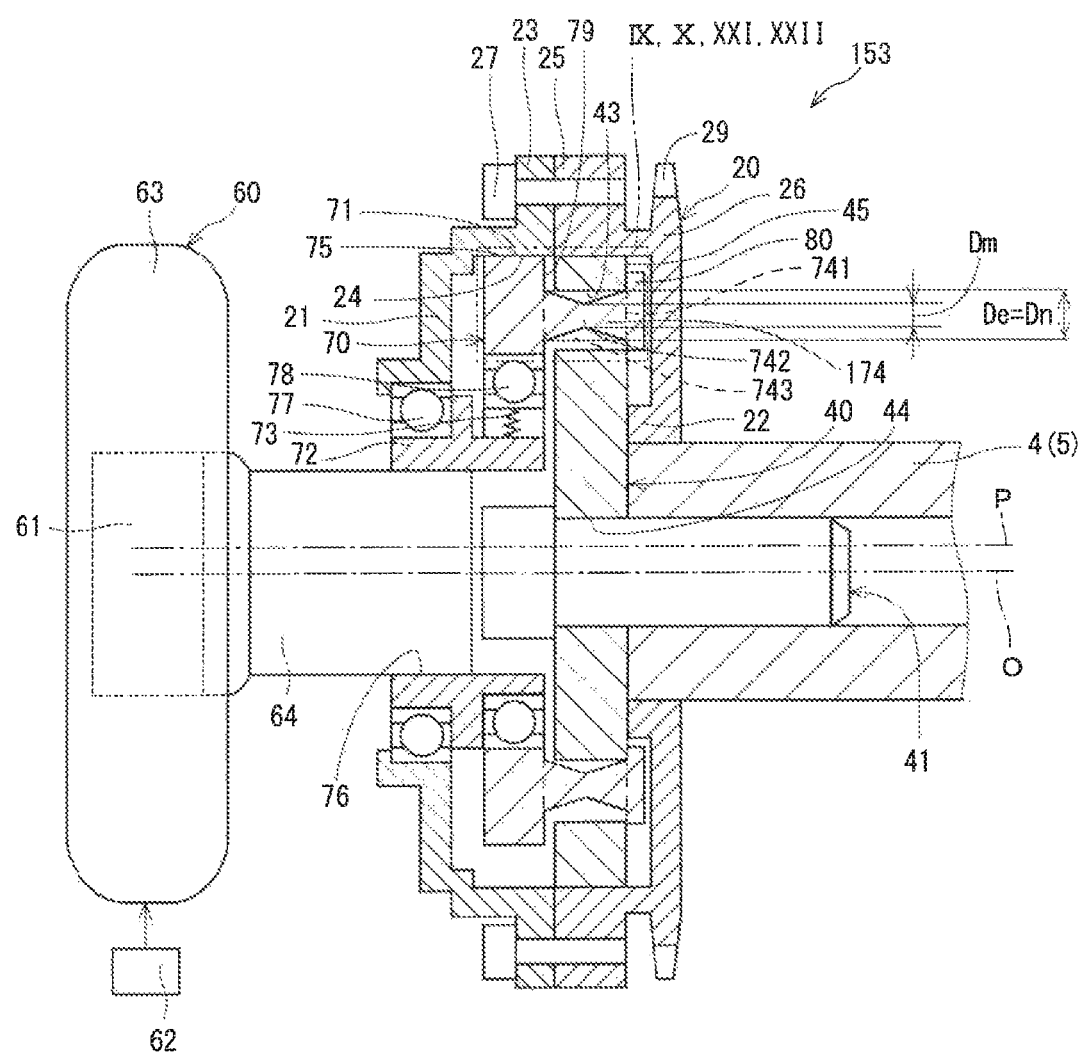
FIG. 8 is a longitudinal sectional view which illustrates a cycloidal speed reducer according to the third embodiment.
Figure 9:
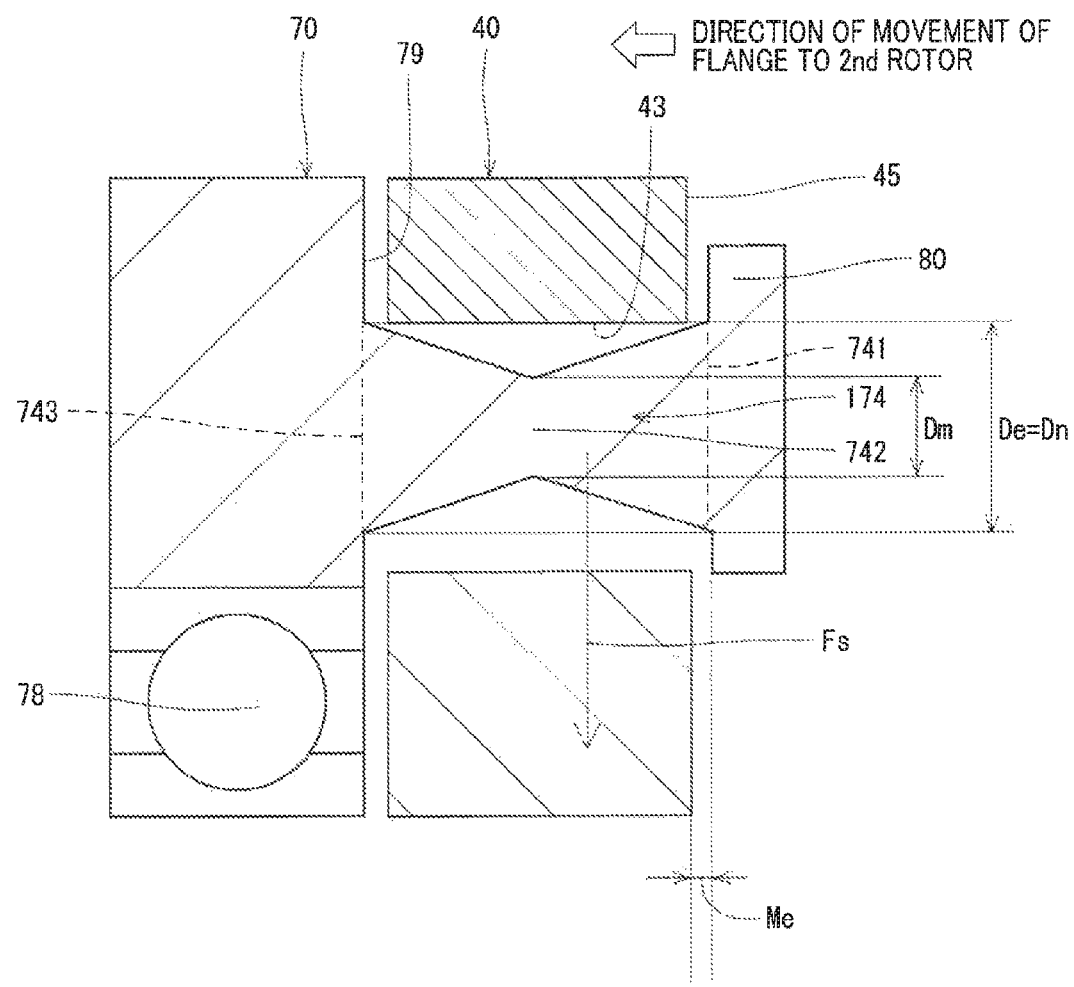
FIG. 9 is an enlarged view, as enclosed by a broken line IX in FIG. 8.

FIGS. 8 and 9 illustrate the cycloidal speed reducer 153 according to the third embodiment which is different in configuration of the cylindrical pins 174 from the first embodiment. Other arrangements are identical, and explanation thereof in detail will be omitted here.

Specifically, the cycloidal speed reducer 153 is, as illustrated in FIGS. 8 and 9, equipped with the cylindrical pins 174 each of which has the middle portion 742 constricted in the form of a waist. In this embodiment, the diameter of the middle portion 742 is defined as Dm, the diameter of the end 741 of each of the cylindrical pins 174 is defined as De, and the end 743 of each of the cylindrical pins 174 leading to the third rotor end surface 79 is defined as Dn.

Each of the cylindrical pins 174 is shaped to have the diameters De and Dn equal to each other (De=Dn). Each of the cylindrical pins 174 is also shaped to have the diameter Dm which is smaller than the diameters De and Dn (Dm<De, Dm<Dn). The middle portion 742 serves to facilitate elastic deformation of the cylindrical pin 174.

Figure 10:
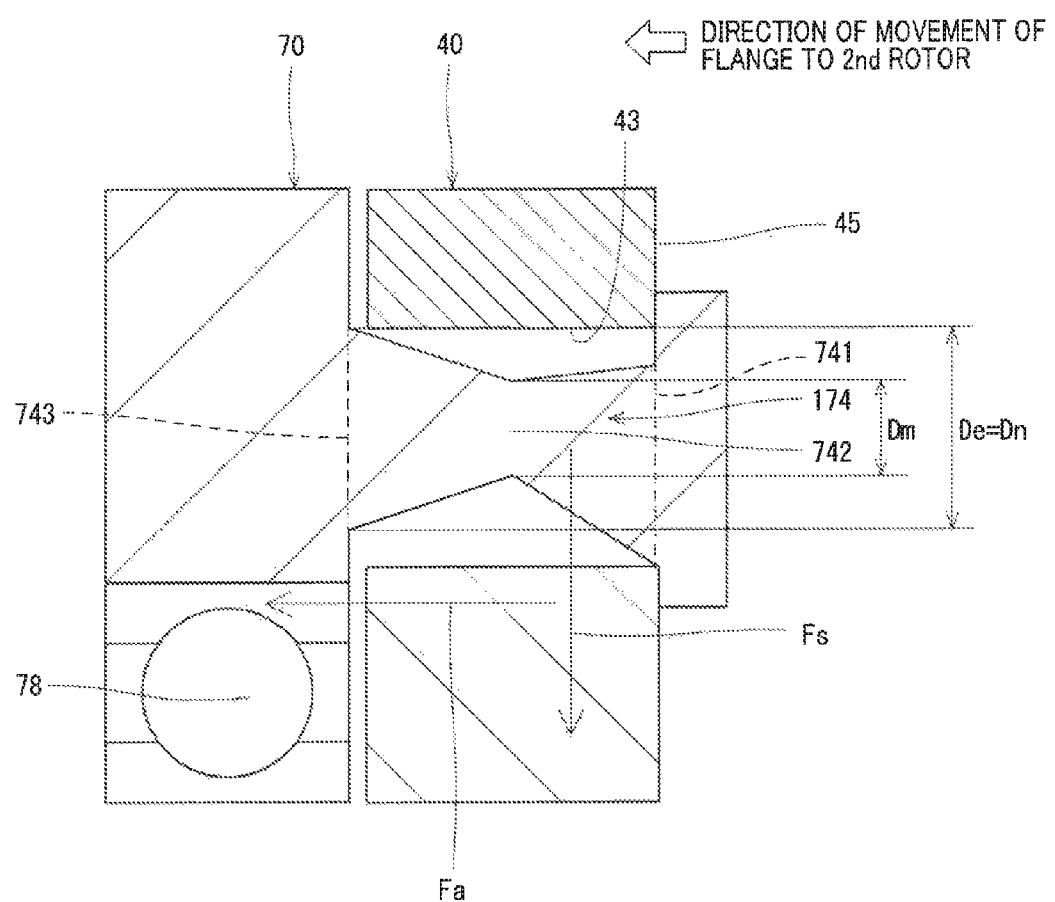
FIG. 10 is an enlarged view which illustrates how a cylindrical pin of the cycloidal speed reducer of FIG. 8 works.

The rotation of the third rotor 70, as demonstrated in FIG. 10, causes the force Fs to be exerted on each of the cylindrical pins 174 by the second rotor 40. This causes the cylindrical pin 174 to be elastically deformed at the middle portion 742, which moves the flange 80 close to the second rotor 40. In other words, the slant periphery of the cylindrical pin 174 contacts the edge of the hole 43, thereby generating the force Fa. When the flange 80 moves close to the second rotor 40, the force Fa increases to ensure the stability of alignment of the third rotor 70 with the second rotor 40 in the same way as in the first embodiment. The structure of the cycloidal speed reducer 153 of the third embodiment offers substantially the same beneficial advantages as those in the first embodiment. FIG. 10 overdraws the elastic deformation of the cylindrical pins 174 in order to facilitate visual perception thereof.

In the following discussion, a distance the flange 80 is moved by the elastic deformation of the cylindrical pin 174 close to the second rotor 40 in the axial direction of the cycloidal speed reducer 153 is defined as Me.

The distance Me is proportional to the degree of the force Fs. The force Fs is proportional to the degree of torque of the third rotor 70. The torque of the third rotor 70 is proportional to the torque Tm, as outputted by the motor shaft 64. The distance Me is, therefore, proportional to the torque Tm. The greater the torque Tm, the greater the distance Me.

A degree of force by which the flange 80 pushes the second rotor 40 usually increases with an increase the distance Me, so that the force Fa is proportional to the distance Me. The distance Me is, therefore, increased as a function of an increase in torque Tm, thus resulting in an increase in force Fa. This further minimizes the inclination of the third rotor 70 relative to the second rotor 40.

Figure 11:
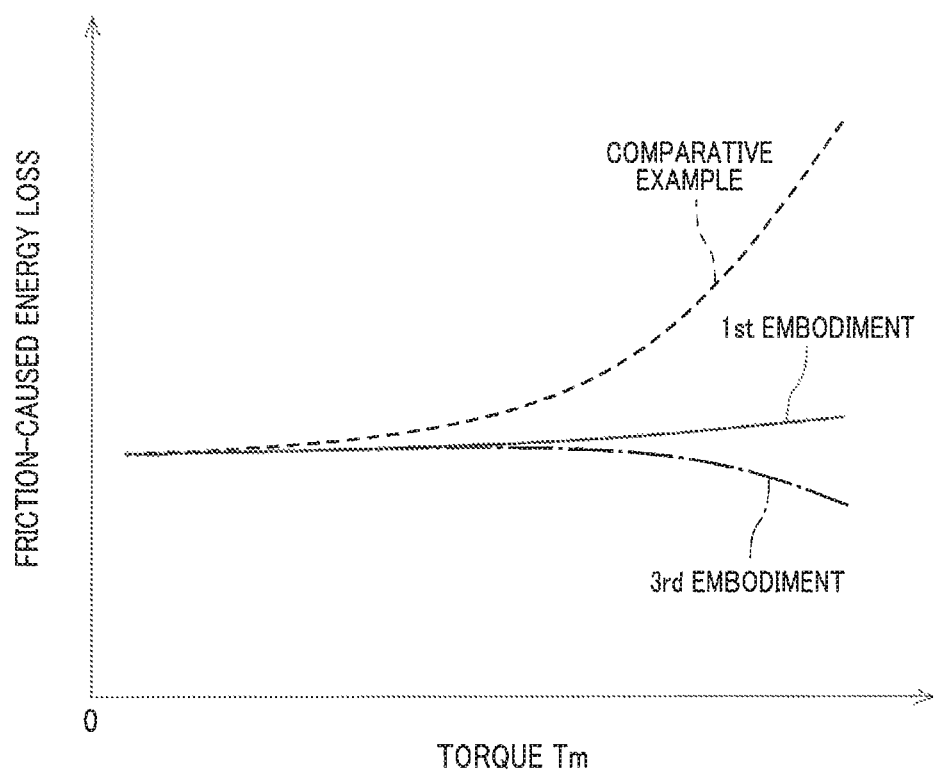
FIG. 11 is a graph which demonstrates relations between torque produced in a cycloidal speed reducer and frictional energy loss in the first embodiment, the third embodiment, and a comparative example.

FIG. 11 is a graph which represents a relation between torque Tm and frictional energy loss in the cycloidal speed reducer 160, as described above as the comparative example. The graph shows that the degree of inclination of the third rotor 70 relative to the second rotor 40 is increased with an increase in torque Tm, thereby resulting in an increase in frictional energy loss. The frictional energy loss is an amount by which kinetic energy of the second rotor 40 and the third rotor 70, as produced by the torque Tm, is lost by conversion into thermal energy, vibrational energy, and sound energy (i.e., noise) due to mechanical friction between the second rotor 40 and the third rotor 70.

The graph of FIG. 11 shows that the cycloidal speed reducer 151 of the first embodiment equipped with the flanges 80 is smaller in frictional energy loss than the cycloidal speed reducer 160, and that the cycloidal speed reducer 153 of the third embodiment is designed to have the distance Me which increases with an increase in torque Tm, thus resulting in a decrease in frictional energy loss.

Fourth Embodiment

Figure 12:
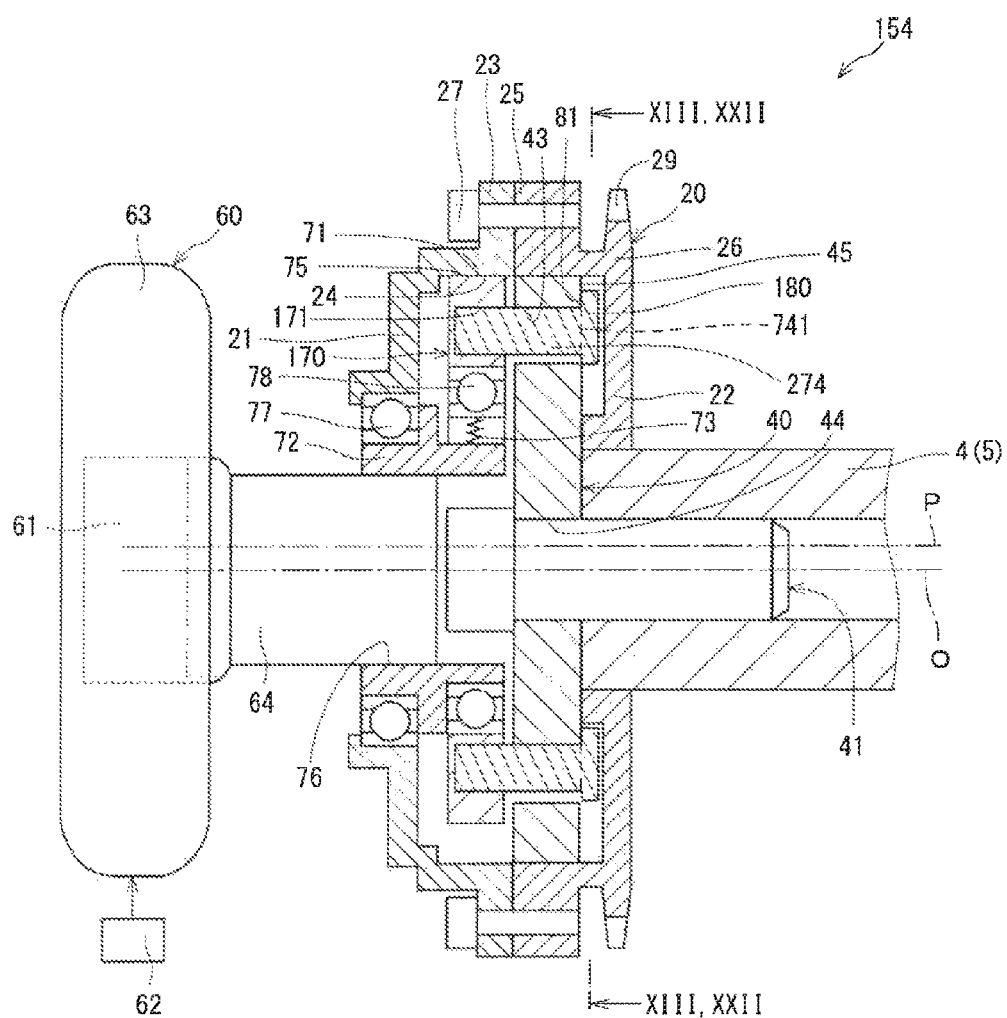
FIG. 12 is a longitudinal sectional view which illustrates a cycloidal speed reducer according to the fourth embodiment.

FIG. 12 illustrates the cycloidal speed reducer 154 according to the fourth embodiment which is different in configuration of the cylindrical pins 274 and the flange 180 from the first embodiment. Other arrangements are identical, and explanation thereof in detail will be omitted here.

The cycloidal speed reducer 154 is, as illustrated in FIG. 12, equipped with the third rotor 170. The third rotor 170 has formed therein third rotor holes 171 each of which is aligned with one of the holes 43 of the second rotor 40. The third rotor holes 171 are identical in configuration with the holes 43.

Each of the cylindrical pins 274 is made of a discrete cylinder separate from the third rotor 170. The cylindrical pins 274 are press-fit in the third rotor holes 171 through the holes 43 to join or engage the second rotor 40 and the third rotor 170 with each other. The cylindrical pins 274 may alternatively be bolted into the third rotor 170.

The cycloidal speed reducer 154 is equipped with the single flange 180. The flange 180 is, as clearly illustrated in FIG. 13, made of a single annular disc which has a ring-shaped transverse section and joined to the ends 741 of all the eight cylindrical pins 274.

When the flange end surface 81 of the flange 180 contacts the outer wall 45 of the second rotor 40 while the cycloidal speed reducer 154 is in operation, it will cause the force Fa to be exerted by the flange 180 on the second rotor 40 in the same way as in the first embodiment. The structure of the cycloidal speed reducer 154 of the fourth embodiment offers substantially the same beneficial advantages as those in the first embodiment.

The single flange 180 is secured to the cylindrical pins 274, thus resulting in a decreased number of parts of the cycloidal speed reducer 154. It is possible to simultaneously insert all the cylindrical pins 274 into the holes 43 and the third rotor holes 171, thereby facilitating the assembling of the cycloidal speed reducer 154. The flange 180 is, as described above, joined to three of more of the ends 741 of the cylindrical pins 274 which are arranged in misalignment with each other, in other words, not arrayed on a single straight line. Such three or more joints define a two-dimensional plane, thereby ensuring the stability of parallelism between the flange 180 (i.e., the second rotor 40) and the third rotor 170.

Fifth Embodiment

Figure 14:
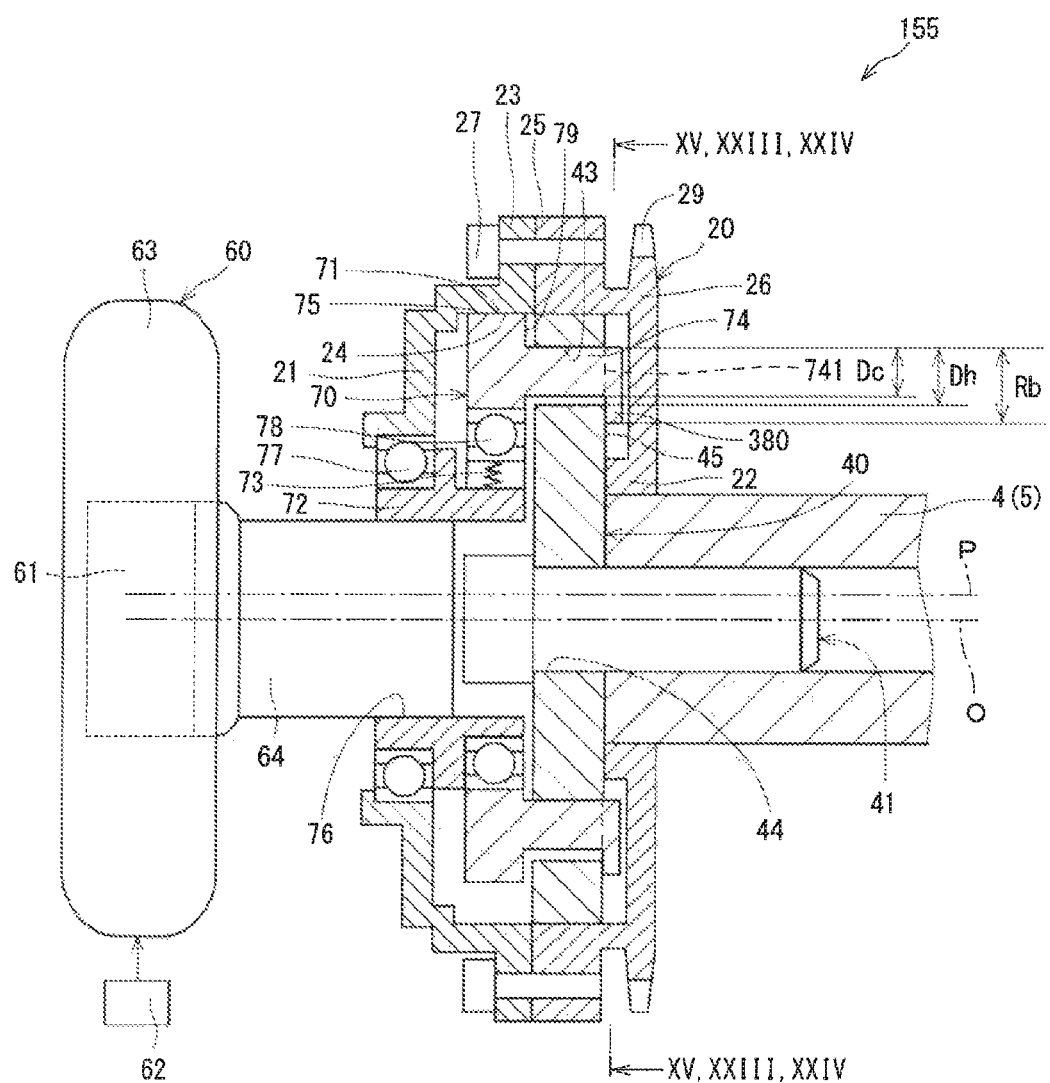
FIG. 14 is a longitudinal sectional view which illustrates a cycloidal speed reducer according to the fifth embodiment.

FIG. 14 illustrates the cycloidal speed reducer 155 according to the fifth embodiment. The cycloidal speed reducer 155 is equipped with the flanges 380 which are different in configuration from the flanges 180 in the first embodiment. Other arrangements are identical with those in the first embodiment, and explanation thereof in detail will be omitted here.

Figure 15:
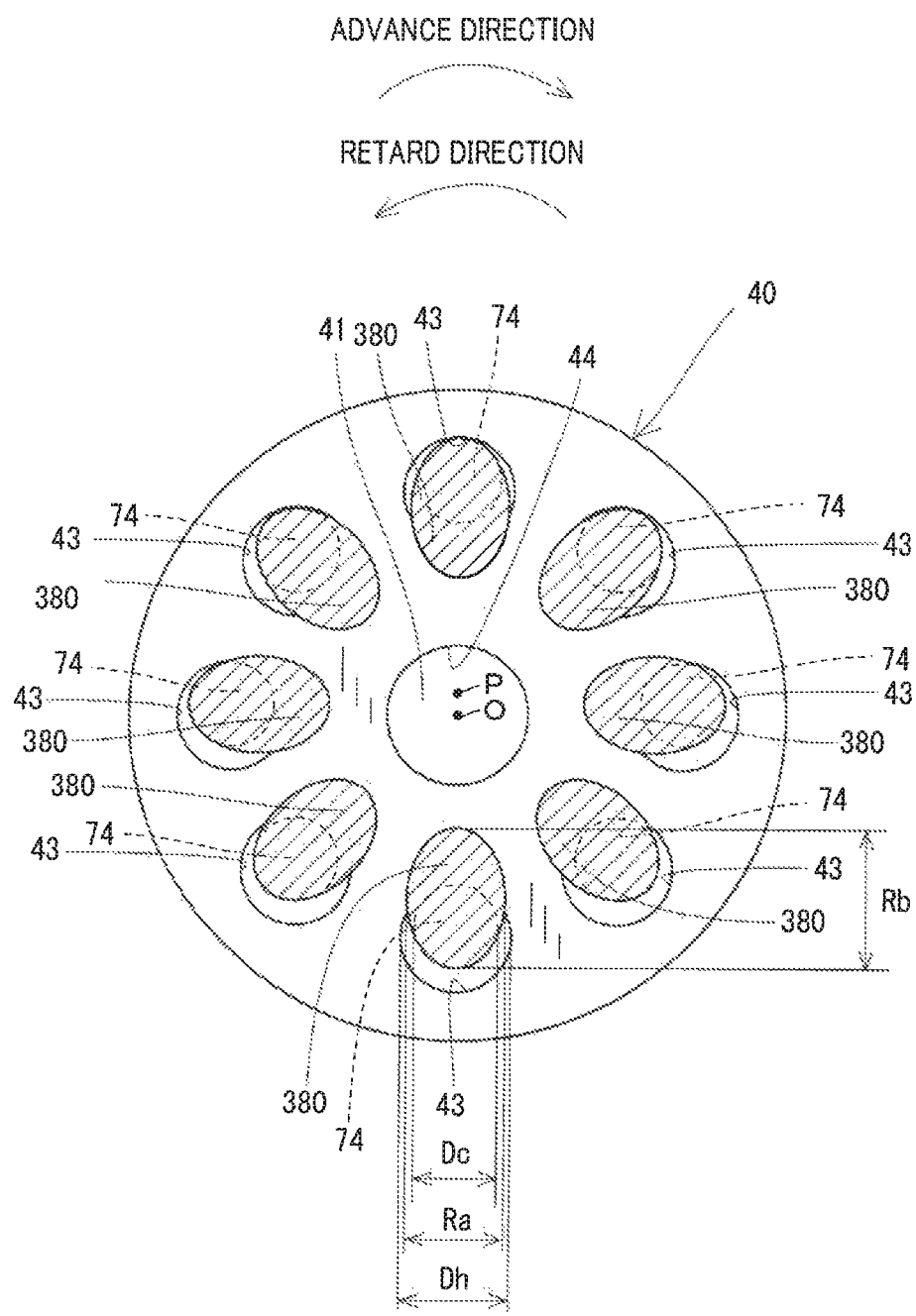
FIG. 15 is a transverse sectional view, as taken along the line XV-XV in FIG. 14, which illustrates a second rotor and cylindrical pines engaging the second rotor of the cycloidal speed reducer of FIG. 14.

Each of the flanges 380, as can be seen in FIGS. 14 and 15, has an ellipsoidal or oval transverse section defined by a minor radius Ra and a major radius Rb.

Each of the flanges 380 is shaped to have the minor radius Ra which is smaller than the diameter Dh of the holes 43 (i.e., Ra<Dh)

Each of the flanges 380 is also shaped to have the major radius Rb which is greater than the diameter Dh of the holes 43 (i.e., Rb>Dh). The flanges 380 are jointed to the cylindrical pins 74, so that a peripheral surface of the flanges 380 which lies at one of opposed ends of the major radius of the oval transverse section is located flush with the side surface of the cylindrical pins 74.

The structure of the cycloidal speed reducer 155 of the fifth embodiment offers substantially the same beneficial advantages as those in the first embodiment. The major radius Rb of the flanges 380 is greater than the diameter Dc of the cylindrical pins 74, thereby ensuring the stability in making physical contact with the outer wall 45 of the second rotor 40. The flanges 380 are shaped to have the minor radius Ra smaller than the diameter Dh of the holes 43, thereby decreasing dimensional restrictions outside or inside the flanges 380 in the radial direction of the cycloidal speed reducer 155. In the illustrated example, the flanges 380 are shaped to eliminate the dimensional restrictions outside them in the radial direction. In other words, the flanges 380 do not extend outside a circle passing through outermost edges of the holes 42 of the second rotor 40, thus minimizing dimensional limitations to parts of the cycloidal speed reducer 155 located outside the circle.

Sixth Embodiment

Figure 16:
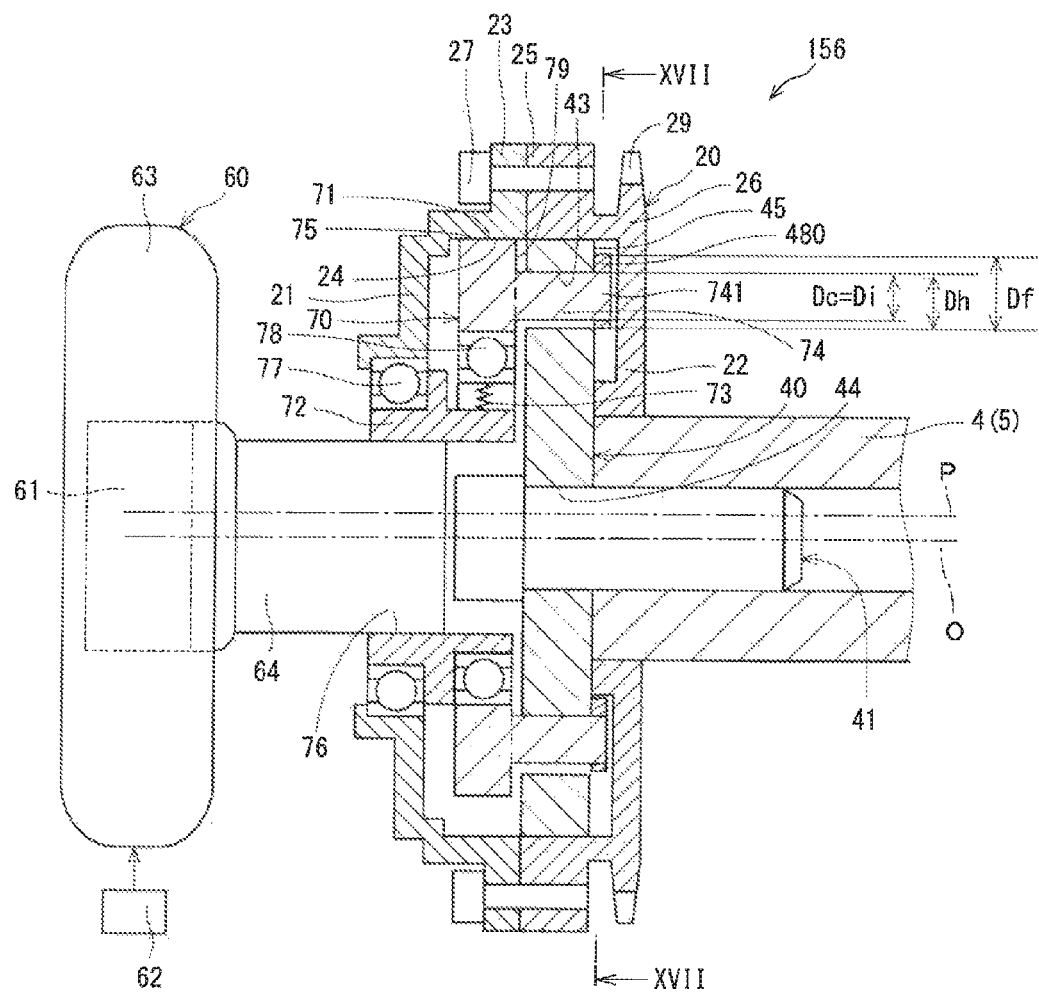
FIG. 16 is a longitudinal sectional view which illustrates a cycloidal speed reducer according to the sixth embodiment.
Figure 17:
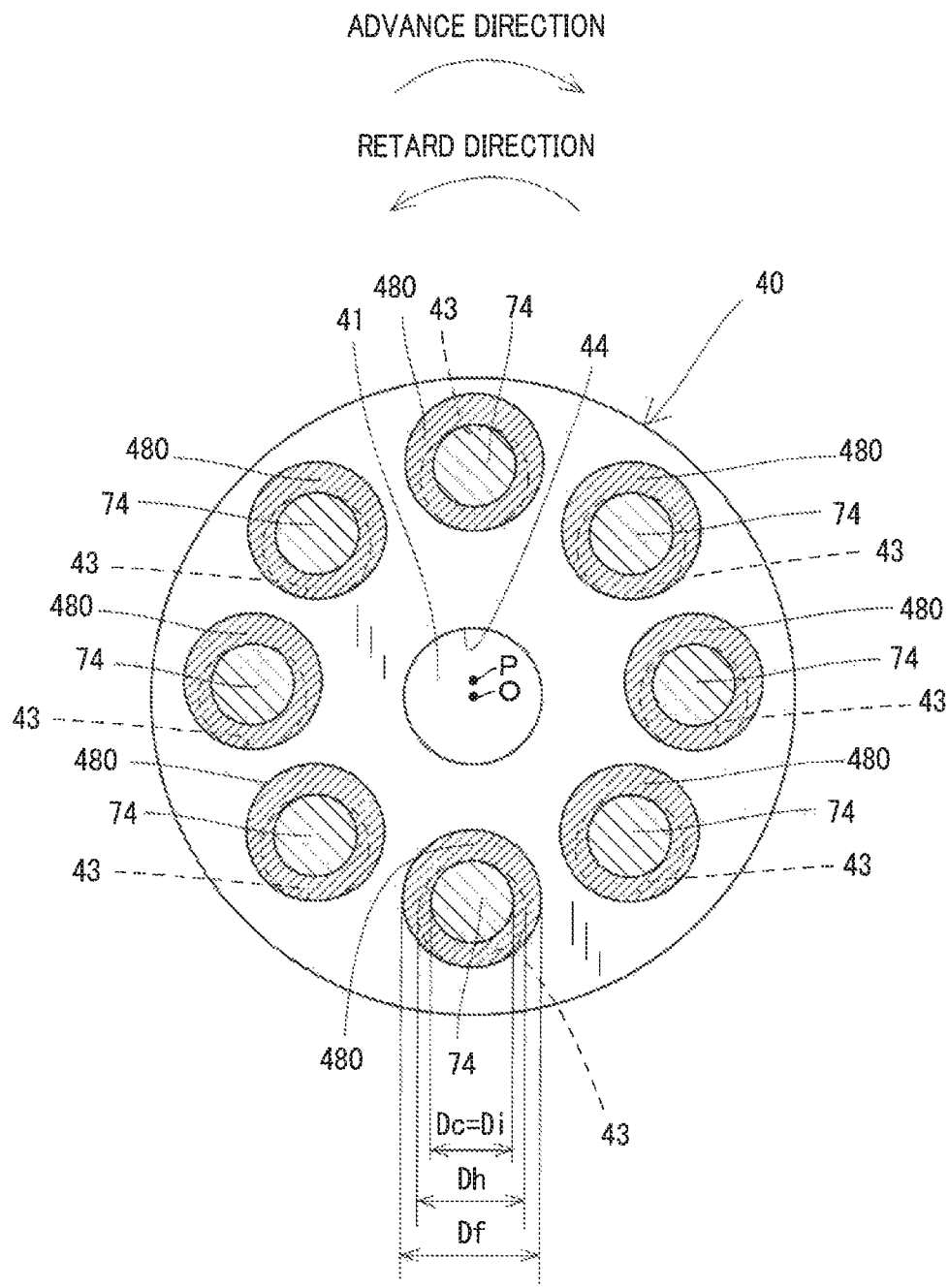
FIG. 17 is a transverse sectional view, as taken along the line XVII-XVII in FIG. 15, which illustrates a second rotor and cylindrical pines engaging the second rotor of the cycloidal speed reducer of FIG. 16.

FIGS. 16 and 17 illustrate the cycloidal speed reducer 156 according to the sixth embodiment. The cycloidal speed reducer 156 is equipped with the flanges 480 which are different in configuration from the flanges 180 in the first embodiment. Other arrangements are identical with those in the first embodiment, and explanation thereof in detail will be omitted here.

Each of the flanges 480, as can be seen in FIGS. 16 and 17, is hollow cylindrical and has an annular transverse section which has an inner diameter Di.

Each of the flanges 480 is shaped to have the inner diameter Ri which is equal to the diameter Dc of the cylindrical pins 74 (i.e., Ri=Dc). Each of the flanges 380 is also shaped to have the outer diameter Df greater than the diameter Dh of the holes 43 (i.e., Df>Dh).

Each of the cylindrical pins 74 is press fit in one of the flanges 480.

The above structure of the cycloidal speed reducer 156 of the sixth embodiment offers substantially the same beneficial advantages as those in the first embodiment. The press-fit of the cylindrical pins 74 in the flanges 480 enhances the strength of joint therebetween.

Seventh Embodiment

Figure 18:
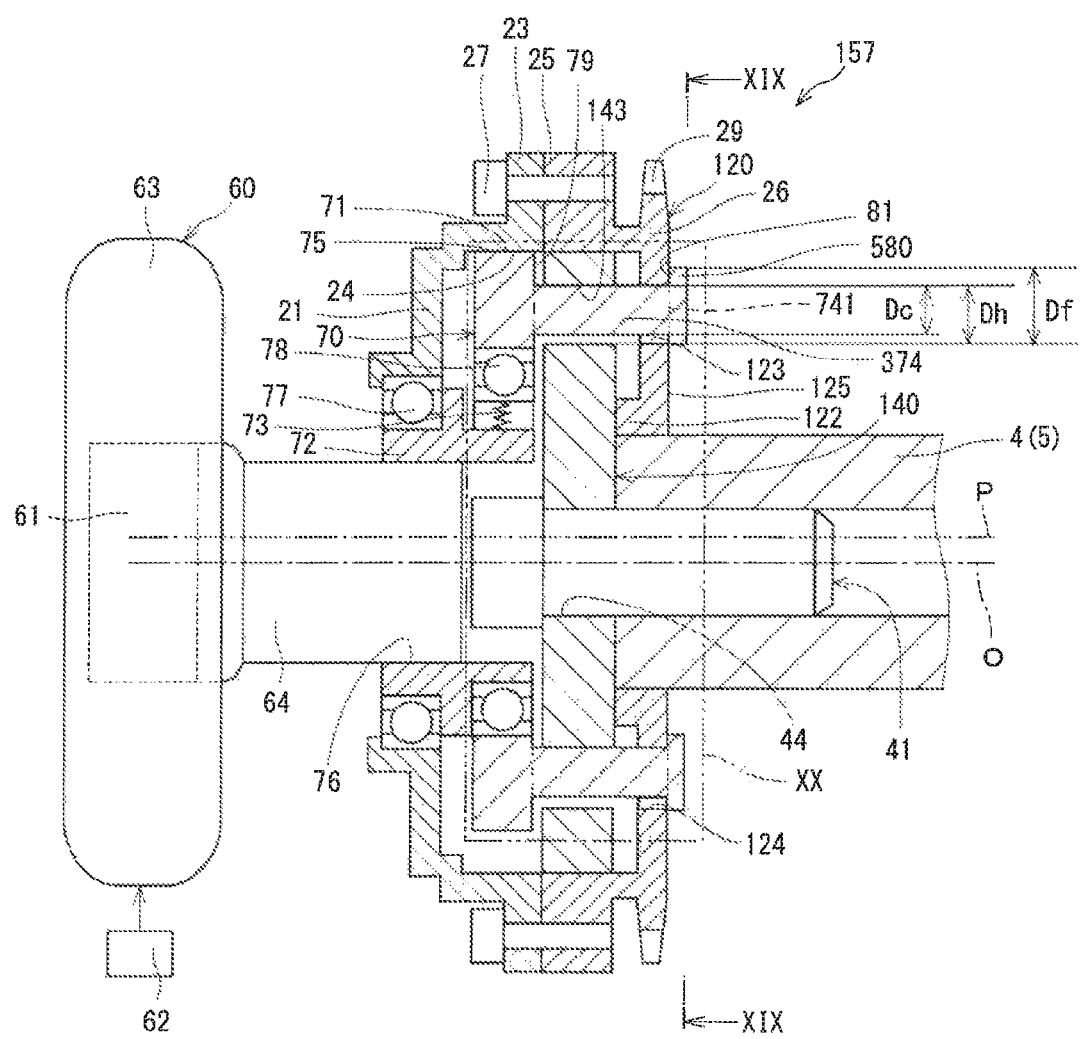
FIG. 18 is a longitudinal sectional view which illustrates a cycloidal speed reducer according to the seventh embodiment.
Figure 19:
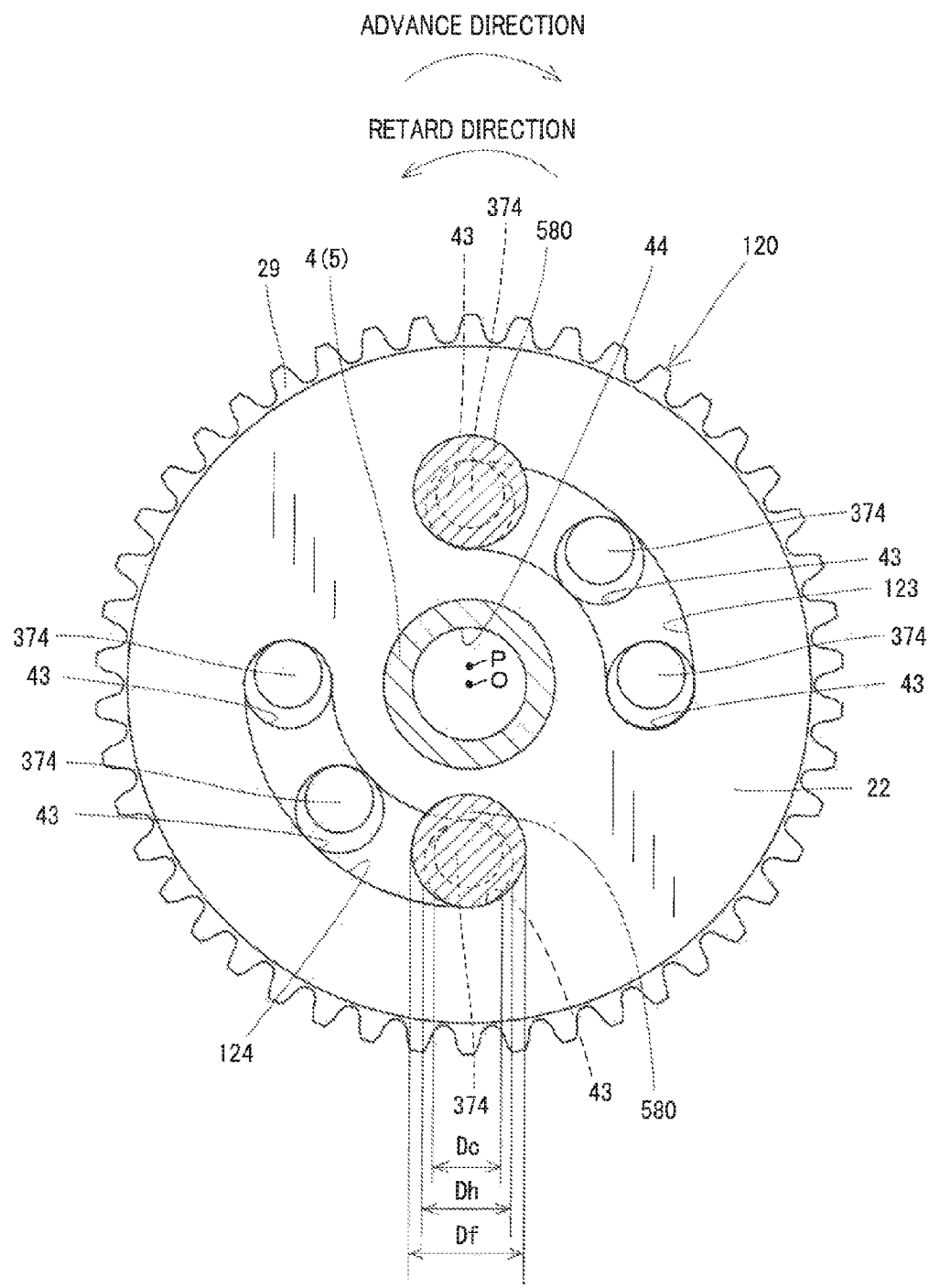
FIG. 19 is a transverse sectional view, as taken along the line XIX-XIX in FIG. 18, which illustrates a second rotor and cylindrical pines engaging the second rotor of the cycloidal speed reducer of FIG. 18.

FIGS. 18 and 19 illustrate the cycloidal speed reducer 157 according to the seventh embodiment.

The cycloidal speed reducer 157 is equipped with the first rotor 120, the second rotor 140, the cylindrical pins 374, and the flanges 580 which are different in configuration from the first embodiment. Other arrangements are identical with those in the first embodiment, and explanation thereof in detail will be omitted here.

The first rotor 120 is equipped with the sprocket 122 which has two through-holes 123 and 124 formed therein in the shape of an arc-shaped slit. The through-holes 123 and 124 are diametrically opposed to each other in the sprocket 122.

Each of the through-holes 123 and 124 has an arc-shaped transverse sectional area identical with a locus of orbital rotation of a circle whose diameter is equal to the diameter Dh of the holes 43 around the rotation axis O by 90°. In other words, each of the through-holes 123 and 124 has a width equal to the diameter Dh and also has a longitudinal center line corresponding to a one-fourth segment of a circle about the rotation axis O.

The second rotor 140 has formed therein six holes 43 three of which are fully exposed to one of the through-holes 123 and 124. The cylindrical pins 374 are formed integrally with the third rotor 70 and extend from the third rotor end surface 79 to the first rotor 120 through the second rotor 140.

The cylindrical pins 374 extend through the holes 43 and either of the through-holes 123 and 124 to join the first rotor 120, the second rotor 140, and the third rotor 70 together. The flanges 580 are, as can be seen in FIG. 19, joined to the ends 741 of two of the cylindrical pins 374 which are diametrically opposed to each other across the rotation axis O.

The flanges 580 expand along the major surface of the first rotor 120 in the radial direction of the first rotor 120.

Figure 20:
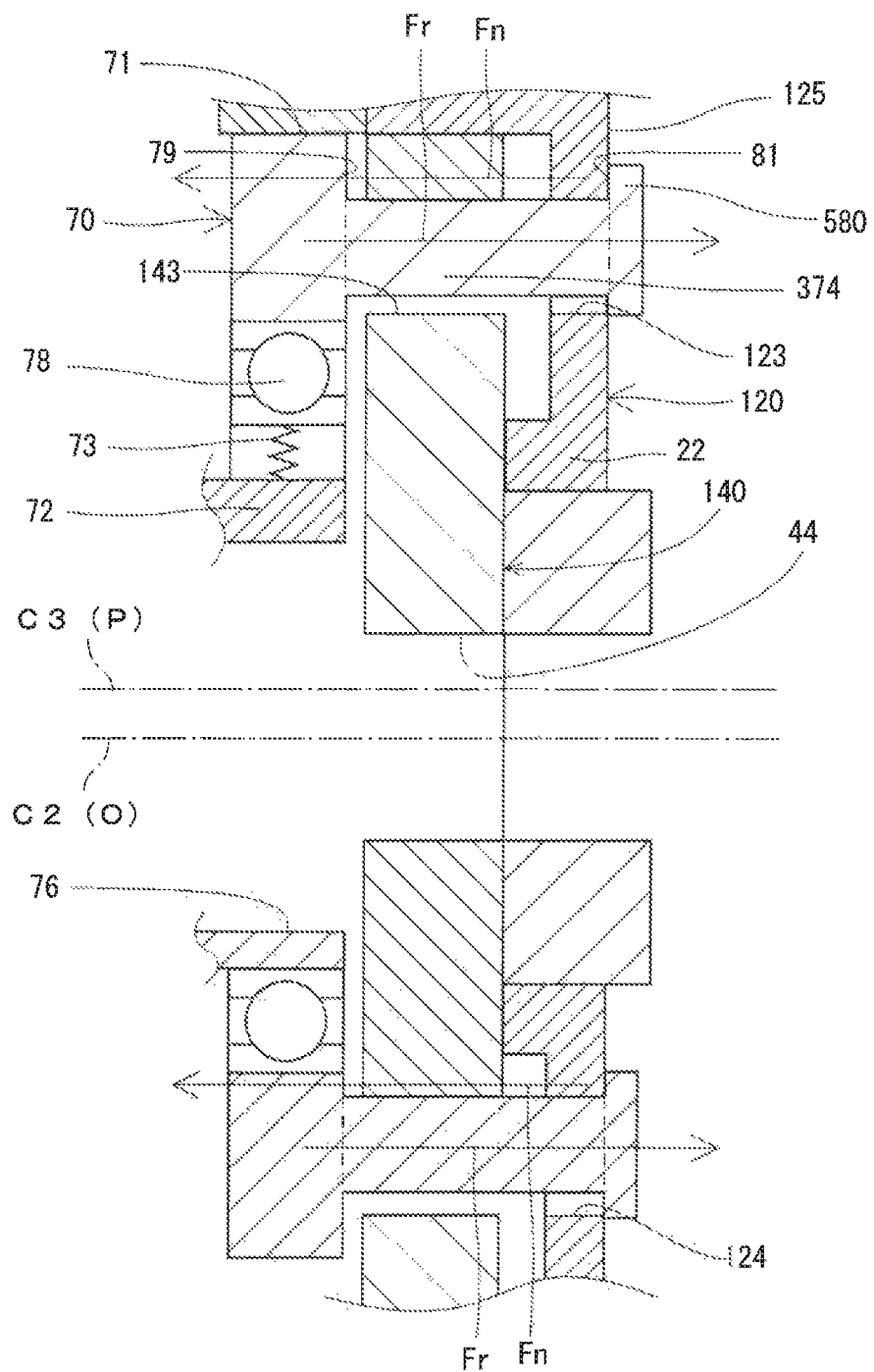
FIG. 20 is an enlarged view, as enclosed by a broken line XX in FIG. 18.

In operation of the cycloidal speed reducer 157, when the flange end surface 81 of each of the flanges 580 which faces the first rotor 120 contacts the outer major surface 125 of the first rotor 120, the flanges 580, as illustrated in FIG. 20, exert the force Fn on the first rotor 120 to attract the first rotor 120 to the third rotor 70. The flanges 580 is subjected to the force Fr from the first rotor 120 which is developed by reaction to the force Fn. The force Fr works to urge the third rotor 70 toward the second rotor 140. The flanges 580, therefore, serve to eliminate the risk of inclination of the third rotor 70 relative to the second rotor 140. The structure of the cycloidal speed reducer 157 of the seventh embodiment, thus, offers substantially the same beneficial advantages as those in the first embodiment.

Modifications (i) The cycloidal speed reducer in each of the above embodiments may be designed to have at least one cylindrical pin and at least one hole with which the cylindrical pin engages. This arrangement offers substantially the same advantages as those in the first embodiment.

(ii) The intermediate member 82 may be designed to have at least one through-hole 83. This also offers substantially the same advantages as those in the seventh embodiment. The sprocket 122 may be designed to have at least one through-hole 123 or 124. This also offers substantially the same advantages as those in the seventh embodiment.

Figure 21:
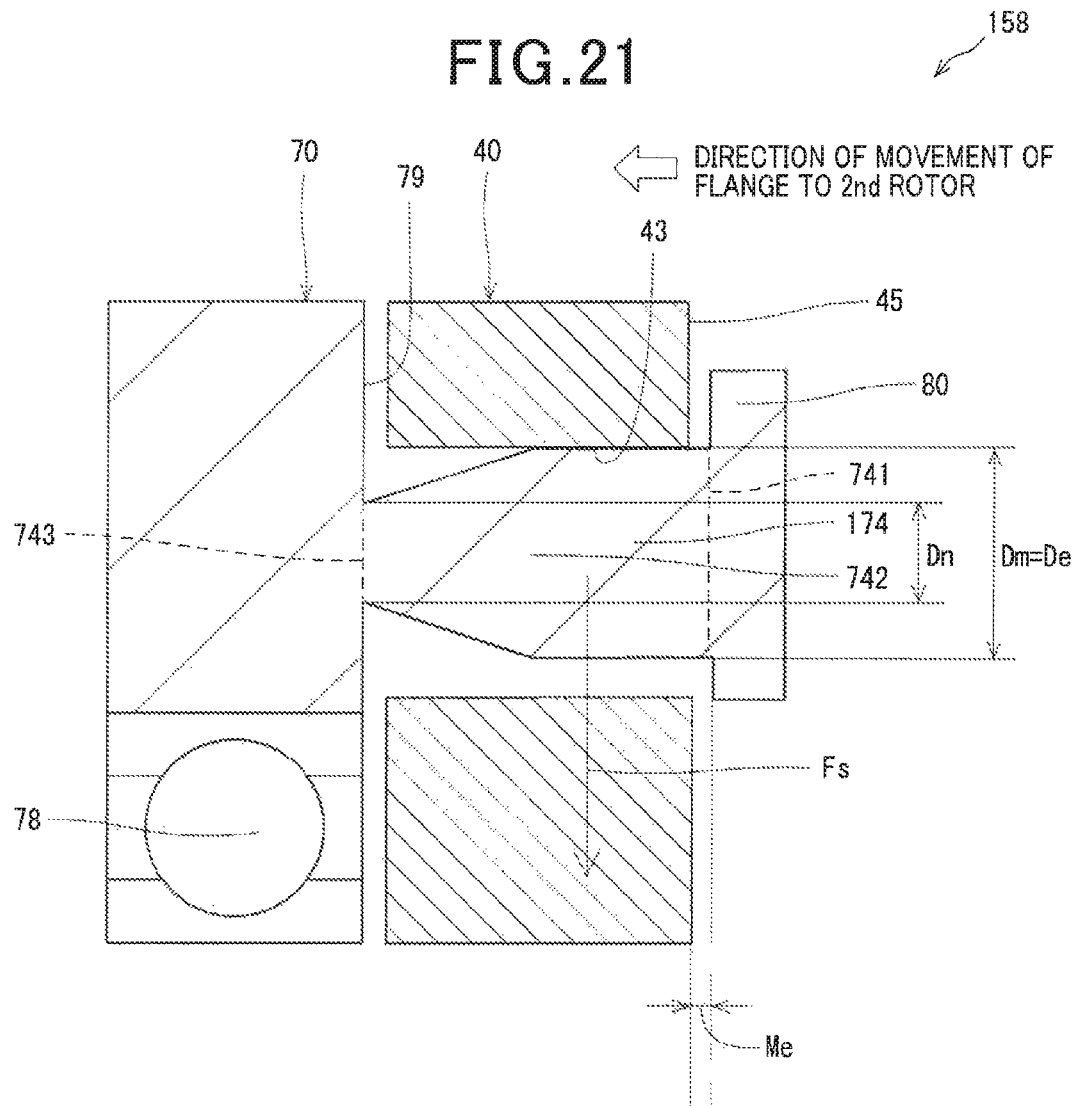
FIG. 21 is a sectional view which illustrates a modification of a cycloidal speed reducer.

(iii) FIG. 21 illustrates the cycloidal speed reducer 158 which is a modification of the cycloidal speed reducer 153 of the third embodiment shown in FIGS. 8 and 9. The cycloidal speed reducer 158 is equipped with the cylindrical pins 174 which has the diameter Dm (i.e., a diameter of a major part of the cylindrical pins 174) equal to the diameter De of the end 741 (i.e., Dm=De). Each of the cylindrical pins 174 has a tapered end portion leading to the third rotor end surface 79 of the third rotor 70.

Each of the cylindrical pins 174 is shaped to have the diameter Dn of the end 743 which is smaller than the diameter Dm and the diameter De. In other word, each of the cylindrical pins 174 has a tapered end portion leading to the third rotor end surface 79 of the third rotor 70. This facilitates the ease with which the cylindrical pins 174 are elastically deformed at the ends 743.

The cylindrical pins 174 may be made from metallic material, such as gray (cast) iron, copper, aluminum, titanium, or alloy containing some of all of them, whose Young's modulus is relatively low. This also offers substantially the same advantages as in the third embodiment.

Figure 22:
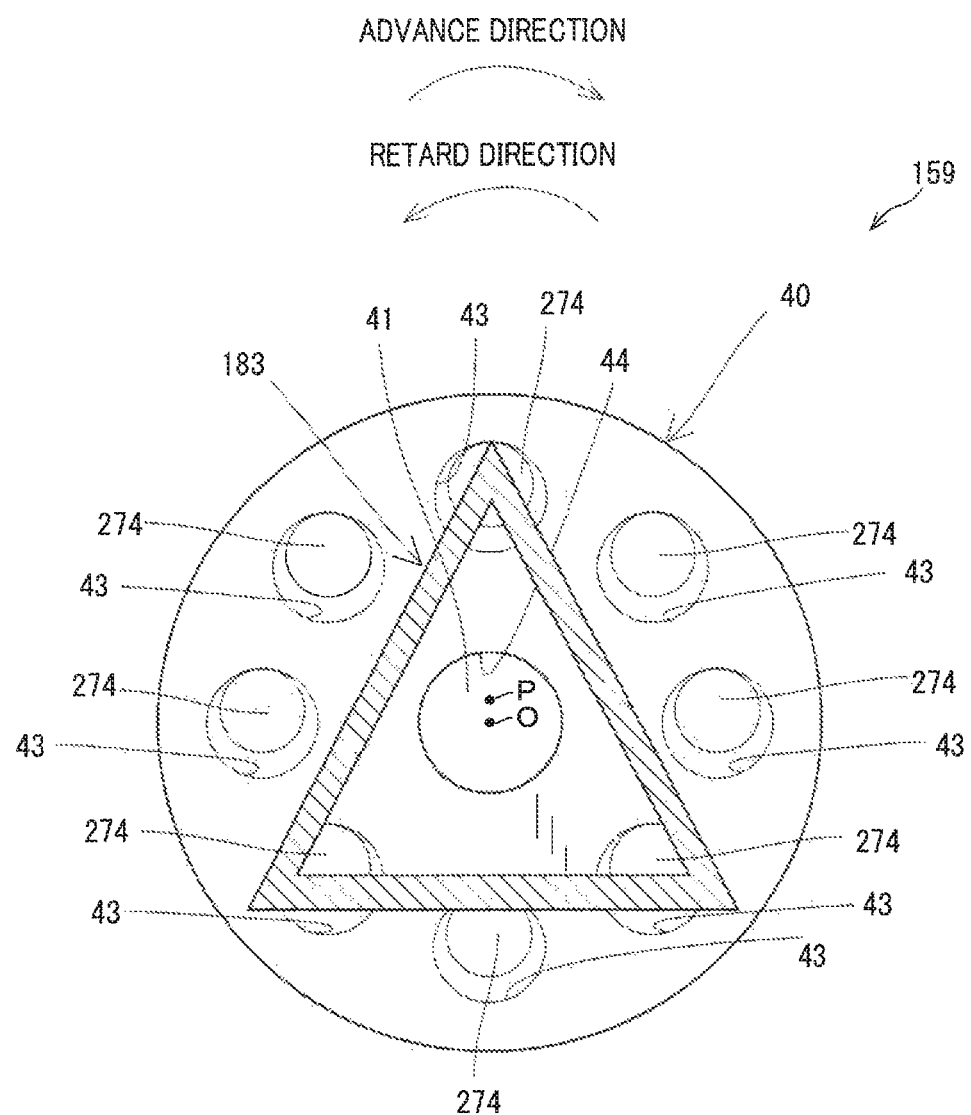
FIG. 22 is a sectional view which illustrates a modification of a cycloidal speed reducer.

(iv) FIG. 22 illustrates the cycloidal speed reducer 159 which is a modification of the cycloidal speed reducer 154 of the fourth embodiment shown in FIG. 12. The cycloidal speed reducer 159 is equipped with a single flange 183 which has a triangular transverse section, as taken in a direction perpendicular to the axial direction of the cycloidal speed reducer 159. The flange 183 is secured to the ends 741 of the three cylindrical pins 274 which are not aligned with each other. This also offers substantially the same advantages as in the fourth embodiment.

The flanges in the above embodiments may be shaped to have a polygonal or oval transverse section. The cycloidal speed reducers in the above embodiment may have the cylindrical pins whose number is not limited to the one illustrated in the drawings. It is advisable that at least one flange be secured to the ends 741 of three of the cylindrical pins which are not aligned with each other, that is, not arranged on a straight line.

Figure 23:
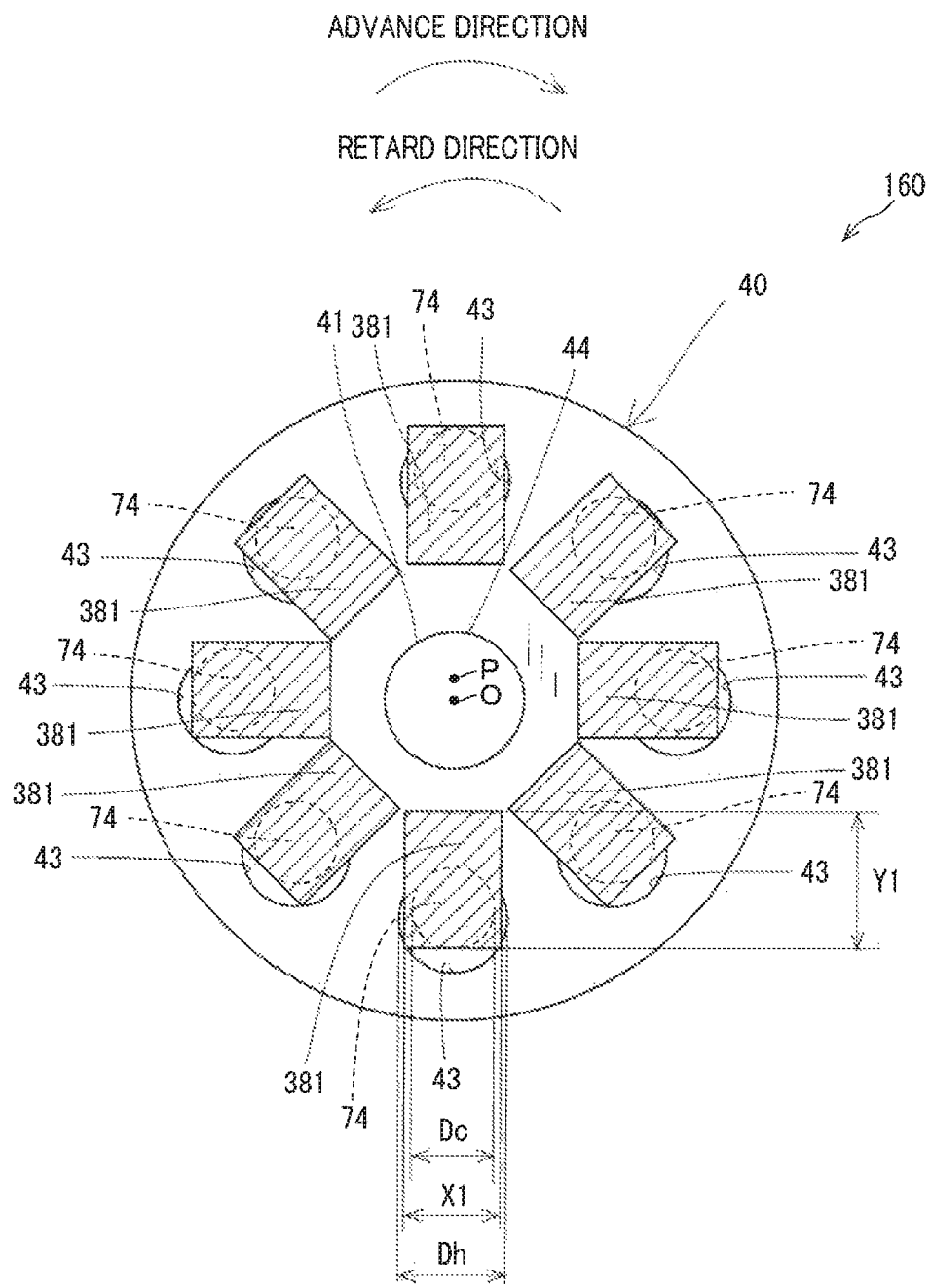
FIG. 23 is a sectional view which illustrates a modification of a cycloidal speed reducer.

(v) FIG. 23 illustrates the cycloidal speed reducer 160 which is a modification of the cycloidal speed reducer 155 of the fifth embodiment shown in FIG. 14. The cycloidal speed reducer 160 is equipped with the flanges 381 which are joined to the cylindrical pins 74 and rectangular in transverse section thereof. Specifically, each of the flanges 381 has short opposite sides whose length is X1 and long opposite sides whose length is Y1. The length Y1 is greater than the length X1.

Each of the flanges 381 is shaped to have the short sides X1 which are smaller than the diameter Dh of the holes 43 (X1<Dh). Each of the flanges 381 is shaped to have the long sides Y1 which are greater than the diameter Dh of the holes 43 (Y1>Dh). The short sides X1 are greater than the diameter Dc of the cylindrical pins 74. The structure of the cycloidal speed reducer 160 also offers substantially the same advantages as those in the fifth embodiment.

Figure 24:
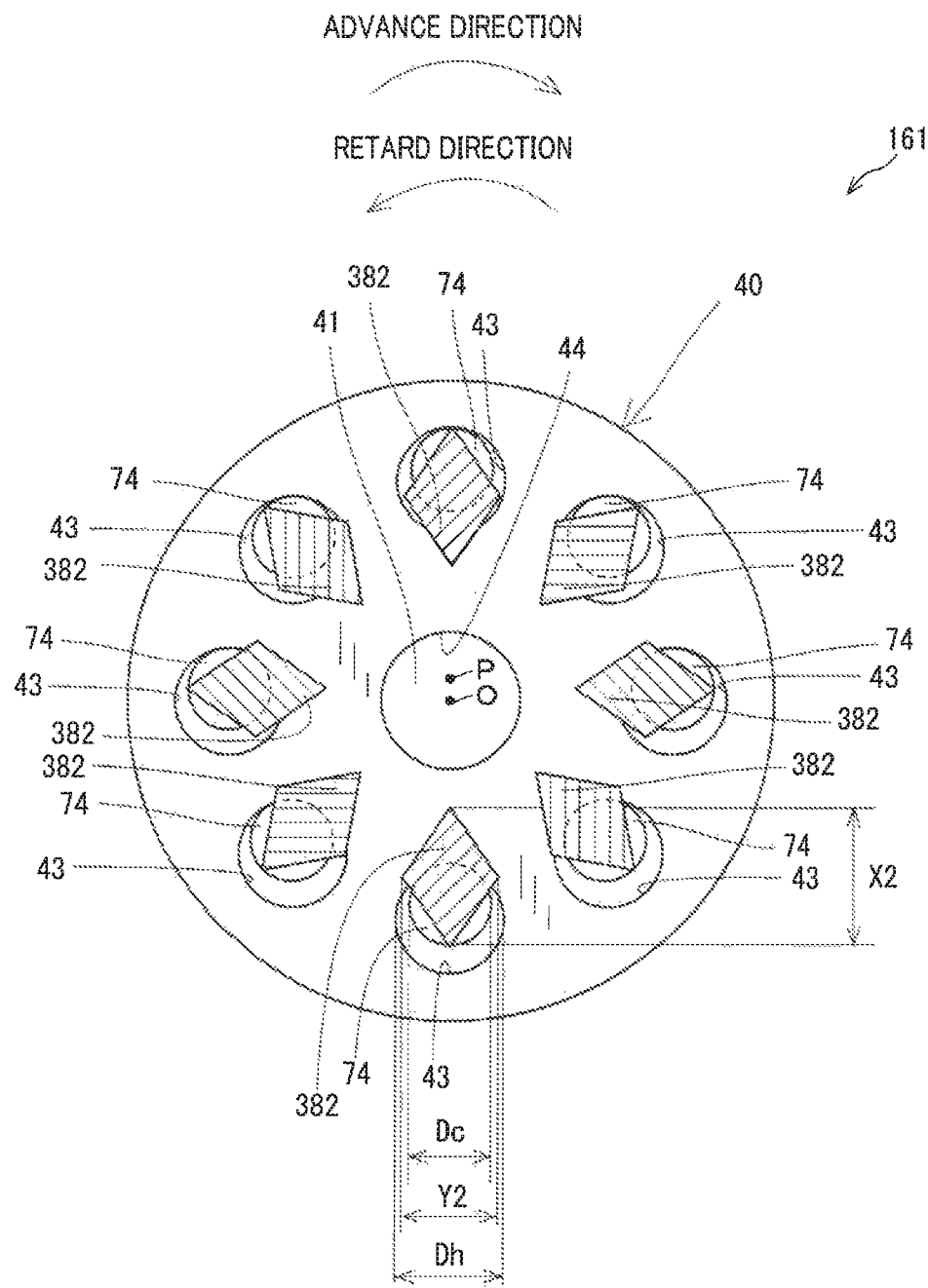
FIG. 24 is a sectional view which illustrates a modification of a cycloidal speed reducer.

FIG. 24 illustrates the cycloidal speed reducer 161 which is another modified form of the cycloidal speed reducer 155 of the fifth embodiment shown in FIG. 14. The cycloidal speed reducer 161 is equipped with the flanges 382 which are joined to the cylindrical pins 74 and have rhombic or diamond-shaped transverse sections each of which has a long diagonal of the length X2 and a short diagonal of the length Y2. The long diagonal X2 is greater than the short diagonal Y2.

Each of the flanges 382 is shaped to have the diagonal X2 greater than the diameter Dh of the holes 43 (X2>Dh). The flanges 382 are also shaped to have the diagonal Y2 smaller than the diameter Dh (Y2<Dh), but greater than the diameter Dc of the cylindrical pins 74. The structure of the cycloidal speed reducer 161 also offers substantially the same advantages as those in the fifth embodiment.

The flanges 381 or 382 may be designed to have another shape other than circular, oval, or diamond shape and also to have other dimensions. The flanges 381 or 382 need to be at least shaped to have a maximum dimension greater than the diameter Dh of the holes 43.

(vi) The cycloidal speed reducer 156 of the sixth embodiment shown in FIGS. 16 and 17 may alternatively be designed to have snap-rings instead of the flanges 480. Specifically, the cylindrical pins 74 each have a circular groove formed in a peripheral wall thereof. The snap-ring with a slit is snap-fit in the circular groove of the cylindrical pin 74.

The flanges 480 or the snap-rings may be designed to have a polygonal shape in transverse cross section with a center hole.

(vii) The cycloidal speed reducer 157 of the seventh embodiment shown in FIGS. 18 and 19 may be designed to additionally have any one, some, or all of the structural features, as discussed in the second to sixth embodiments.

Figure 25:
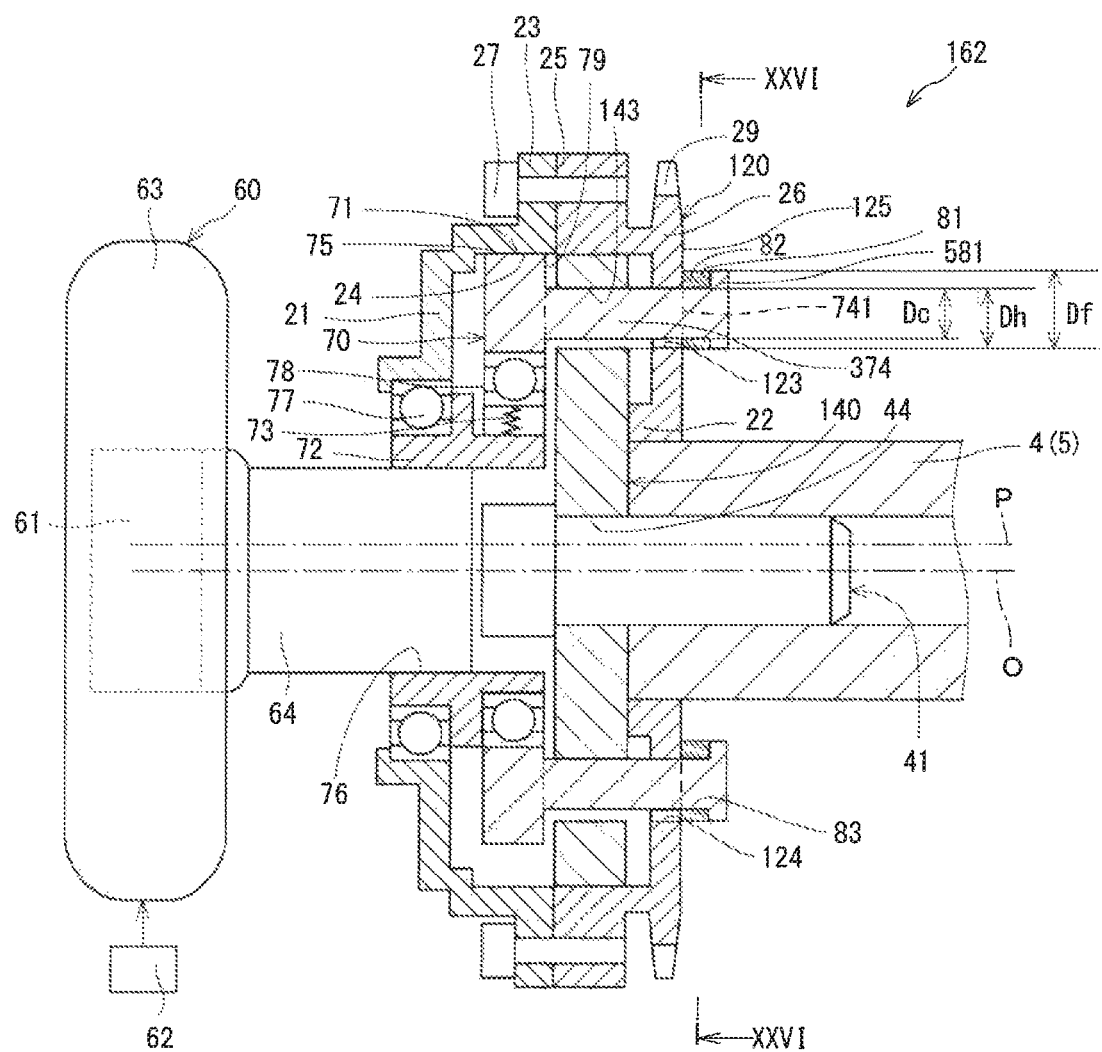
FIG. 25 is a sectional view which illustrates a modification of a cycloidal speed reducer.
Figure 26:
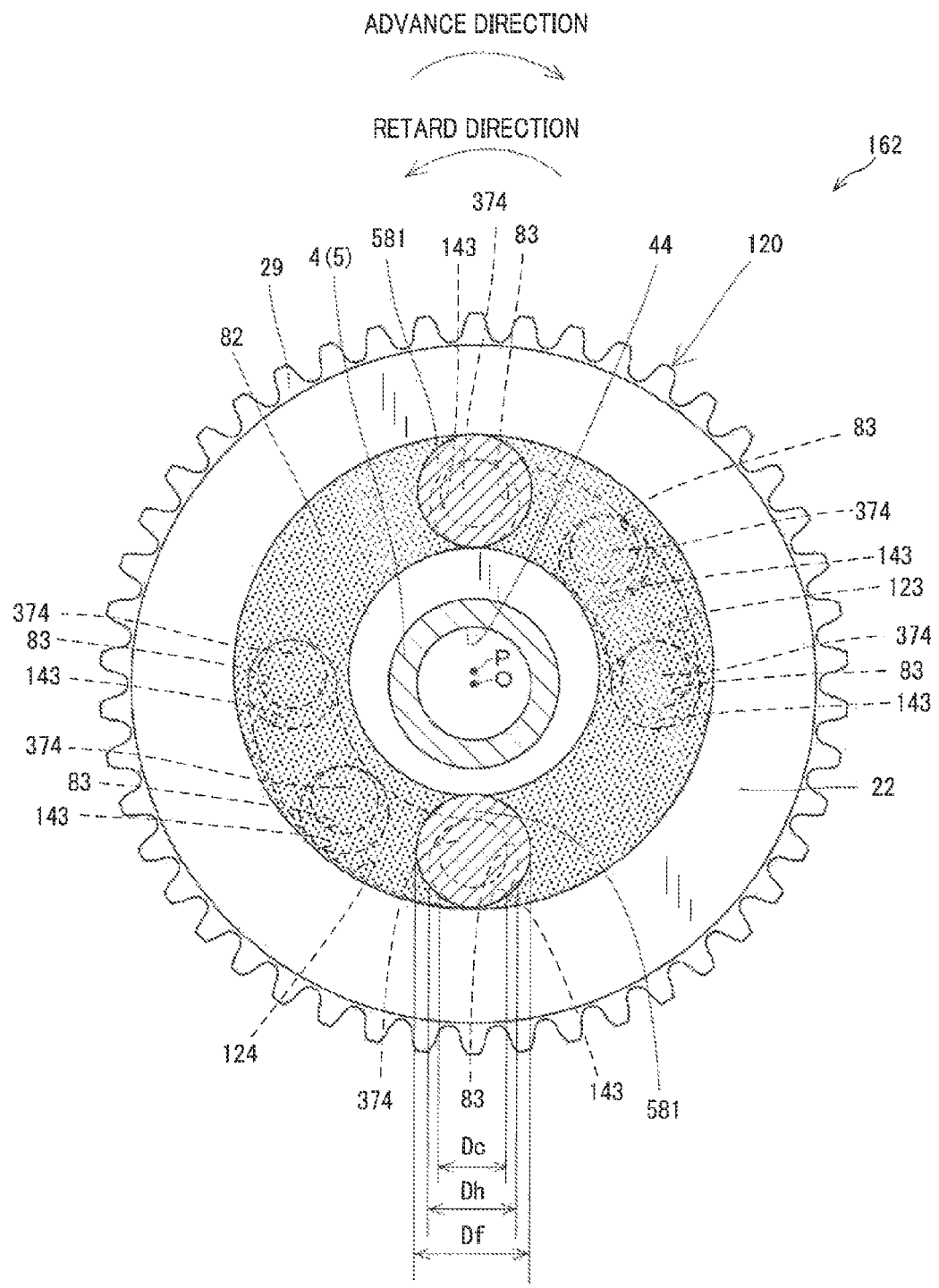
FIG. 26 is a transverse sectional view, as taken along the line XXVI-XXVI in FIG. 25.

FIGS. 25 and 26 illustrate the cycloidal speed reducer 162 that is a modification of the cycloidal speed reducer 157 of the seventh embodiment and additionally has the structural feature in the second embodiment shown in FIGS. 6 and 7. Specifically, the cycloidal speed reducer 162 is equipped with the intermediate members 82. FIG. 26 illustrates the intermediate members 82 using dots in order to facilitate visual perception thereof. The intermediate members 82 are of an annular shape and have formed therein through-holes 83 each of which coincides or is aligned with one of the holes 43 of the second rotor 40 and through which the cylindrical pins 374 pass. The through-holes 83 are identical in diameter with the cylindrical pins 374. In operation of the cycloidal speed reducer 62, when the flange end surface 81 physically contacts the intermediate member 82, the flanges 581 work in the same way as in the seventh embodiment. The use of the intermediate members 82 enhances the stiffness of the flanges 581, so that the flanges 581 have an increased difficult in being elastically deformed.

Figure 27:
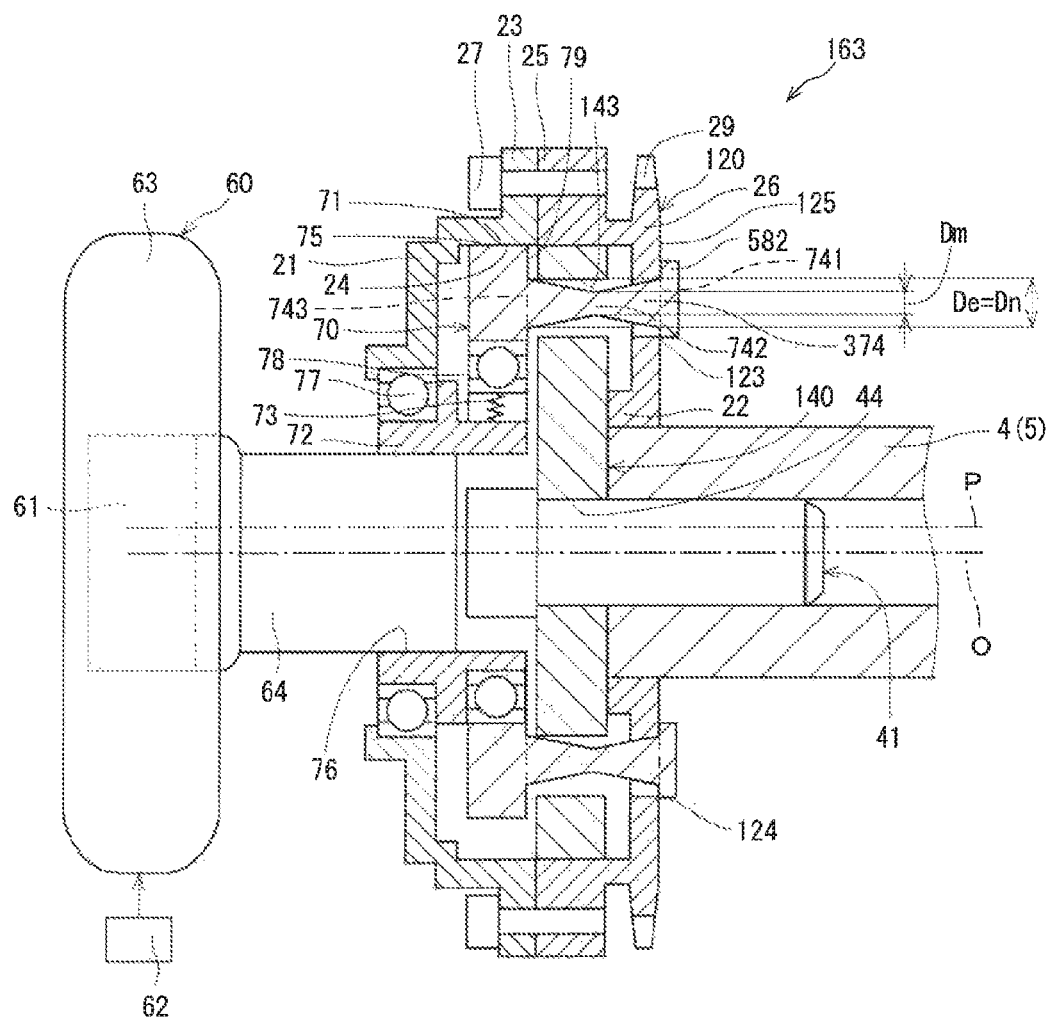
FIG. 27 is a sectional view which illustrates a modification of a cycloidal speed reducer.

FIG. 27 illustrates the cycloidal speed reducer 163 that is a modification of the cycloidal speed reducer 157 of the seventh embodiment and additionally has the structural feature in the third embodiment shown in FIGS. 8 and 9. Specifically, each of the cylindrical pins 374 has the middle portion 742 constricted in the form of a waist.

The configuration of the middle portions 742 facilitates the ease with which the cylindrical pins 374 are elastically deformed when the cycloidal speed reducer 163 is in operation. Specifically, the elastic deformation of the cylindrical pins 374 urges the flanges 581 close to the second rotor 140, thereby ensuring the stability of alignment of the third rotor 70 with the second rotor 140 in the same way as in the third embodiment.

Figure 13:
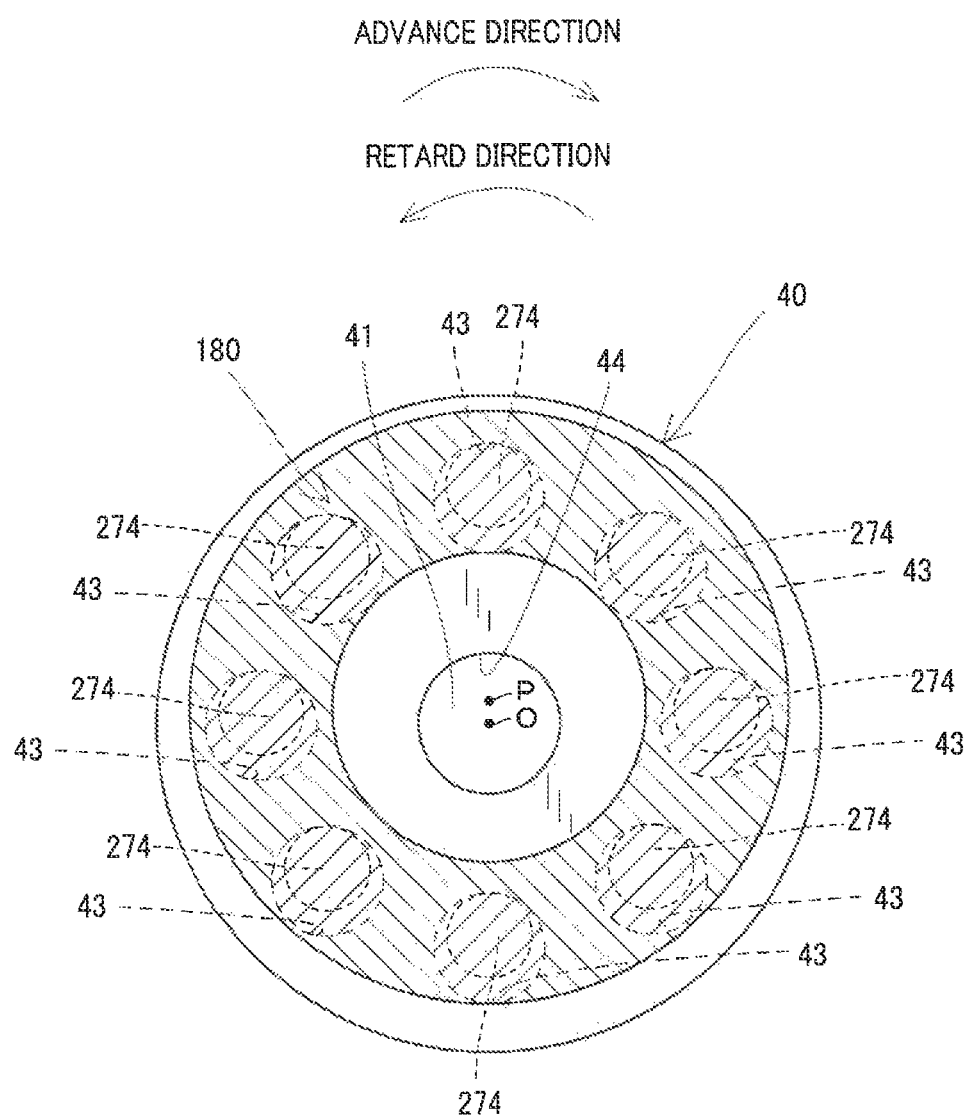
FIG. 13 is a transverse sectional view, as taken along the line XIII-XIII in FIG. 12, which illustrates a second rotor and cylindrical pines engaging the second rotor of the cycloidal speed reducer of FIG. 12.
Figure 28:
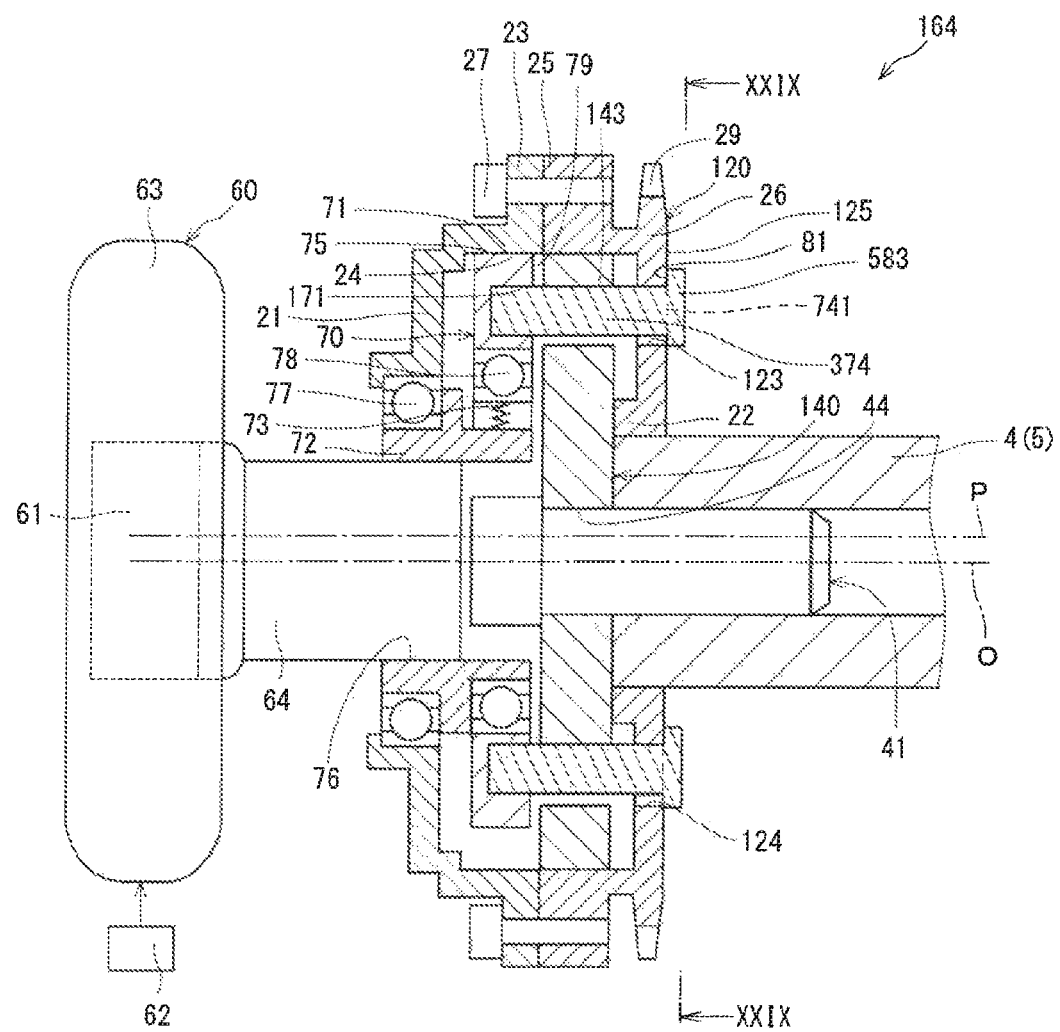
FIG. 28 is a sectional view which illustrates a modification of a cycloidal speed reducer.
Figure 29:
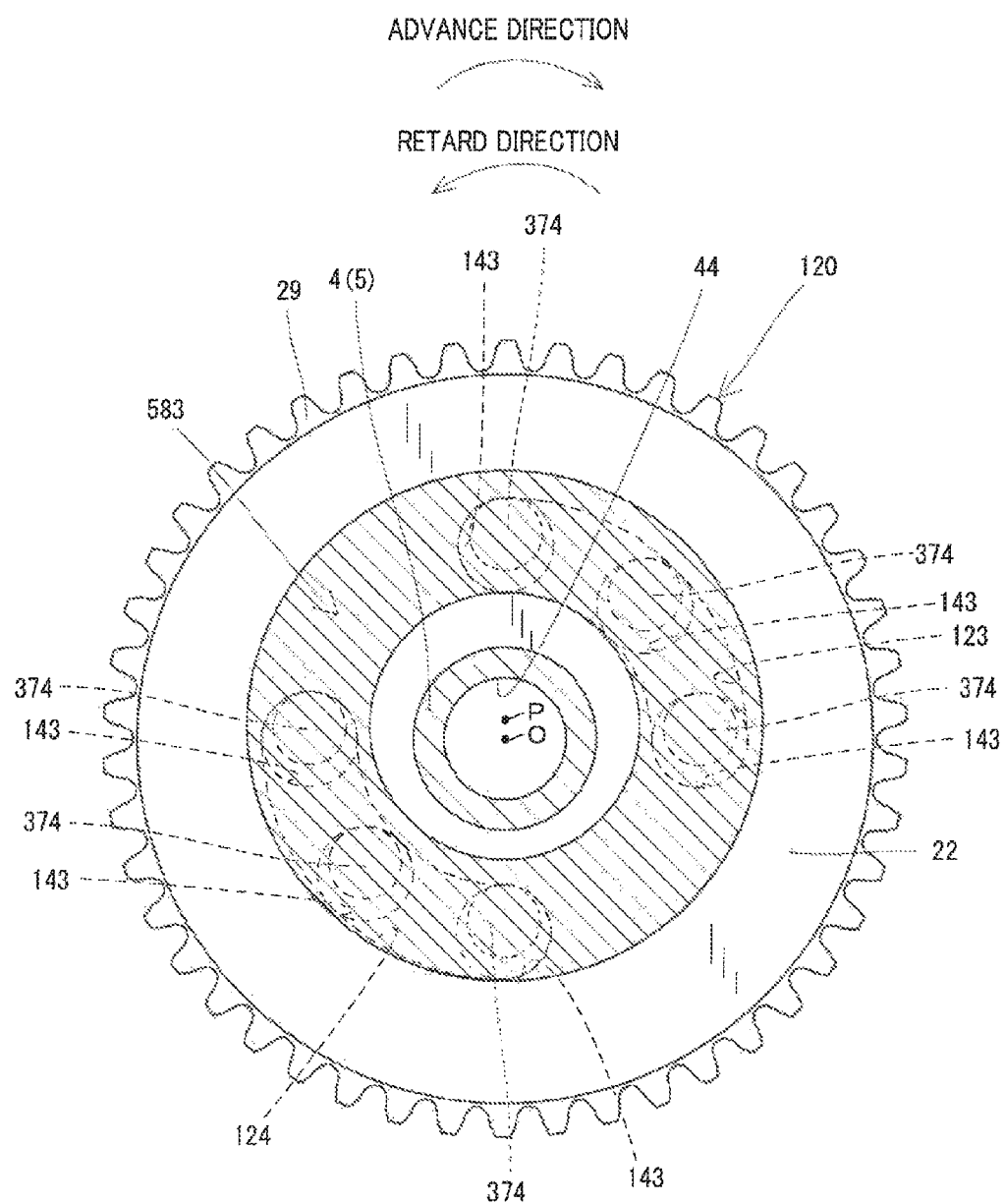
FIG. 29 is a transverse sectional view, as taken along the line XXIX-XXIX in FIG. 28.

FIGS. 28 and 29 illustrate the cycloidal speed reducer 164 which is a modification of the cycloidal speed reducer 157 of the seventh embodiment and additionally has the structural feature in the fourth embodiment shown in FIGS. 12 and 13.

Each of the cylindrical pins 374 is made of a discrete cylinder separate from the third rotor 170. The cylindrical pins 374 are press-fit in the third rotor holes 171 through the holes 143 of the second rotor 140 to join or engage the second rotor 140 and the third rotor 170 with each other. The cylindrical pins 374 are secured to the third rotor 170 using bolts. The cycloidal speed reducer 164 is, as clearly illustrated in FIG. 29, equipped with the single flange 583 which is made of an annular or ring-shaped disc. The flange 583 is secured or joined to the ends 741 of the six cylindrical pins 374.

In operation of the cycloidal speed reducer 164, when flange end surface 81 of the flange 583 contacts the outer wall 45 of the second rotor 140, it will cause the force Fa to be exerted by the flange 583 on the second rotor 140 in the same way as in the fourth embodiment. The structure of the cycloidal speed reducer 164, therefore, offers substantially the same beneficial advantages as those in the fourth embodiment.

Figure 30:
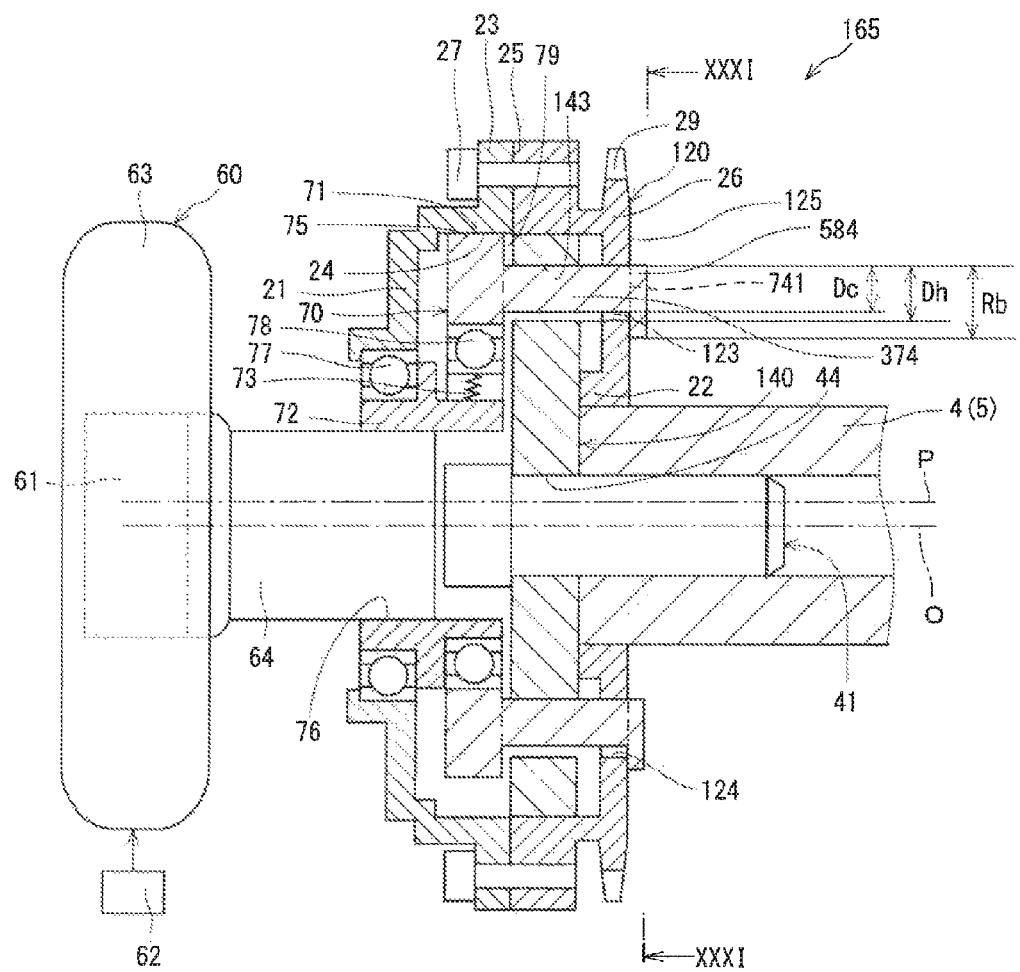
FIG. 30 is a sectional view which illustrates a modification of a cycloidal speed reducer.
Figure 31:
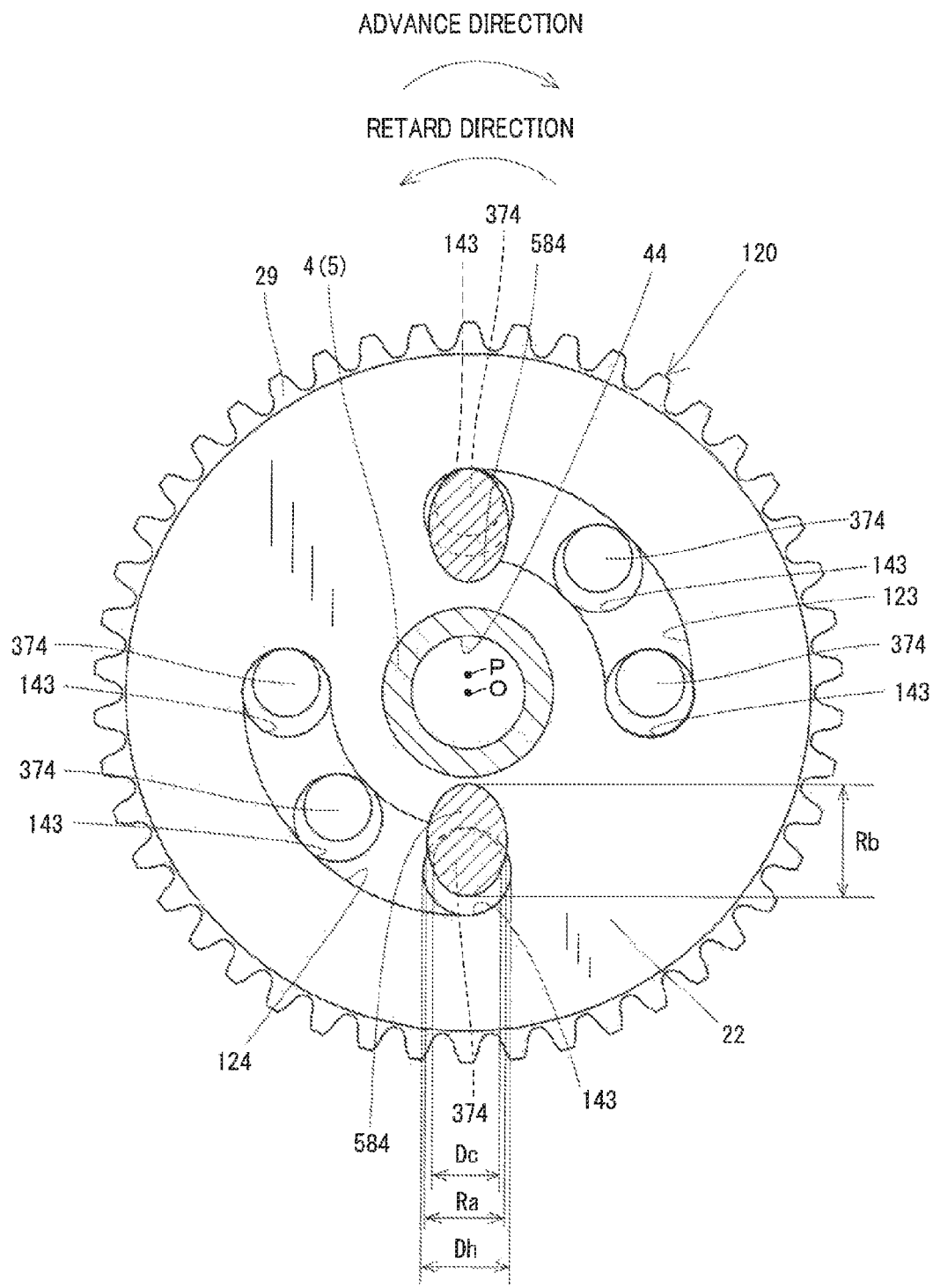
FIG. 31 is a transverse sectional view, as taken along the line XXXI-XXXI in FIG. 30.

FIGS. 30 and 31 illustrate the cycloidal speed reducer 165 which is a modification of the cycloidal speed reducer 157 of the seventh embodiment and additionally has the structural feature in the fifth embodiment shown in FIGS. 14 and 15.

The cycloidal speed reducer 157 is equipped with the two flanges 584 each of which has an ellipsoidal or oval shape defined by a minor radius Ra and a major radius Rb.

Each of the flanges 584 is shaped to have the minor radius Ra which is smaller than the diameter Dh of the holes 143 of the second rotor 140 (i.e., Ra<Dh). Each of the flanges 584 is also shaped to have the major radius Rb which is greater than the diameter Dh of the holes 143 (i.e., Rb>Dh). The flanges 584 are jointed to diametrically opposed two of the cylindrical pins 374, so that a peripheral surface of the flanges 584 which lies at one of opposed ends of the major radius of the oval transverse section is located flush with the side surface of the cylindrical pins 374. The structure of the cycloidal speed reducer 165, therefore, offers substantially the same beneficial advantages as those in the fifth embodiment.

Figure 32:
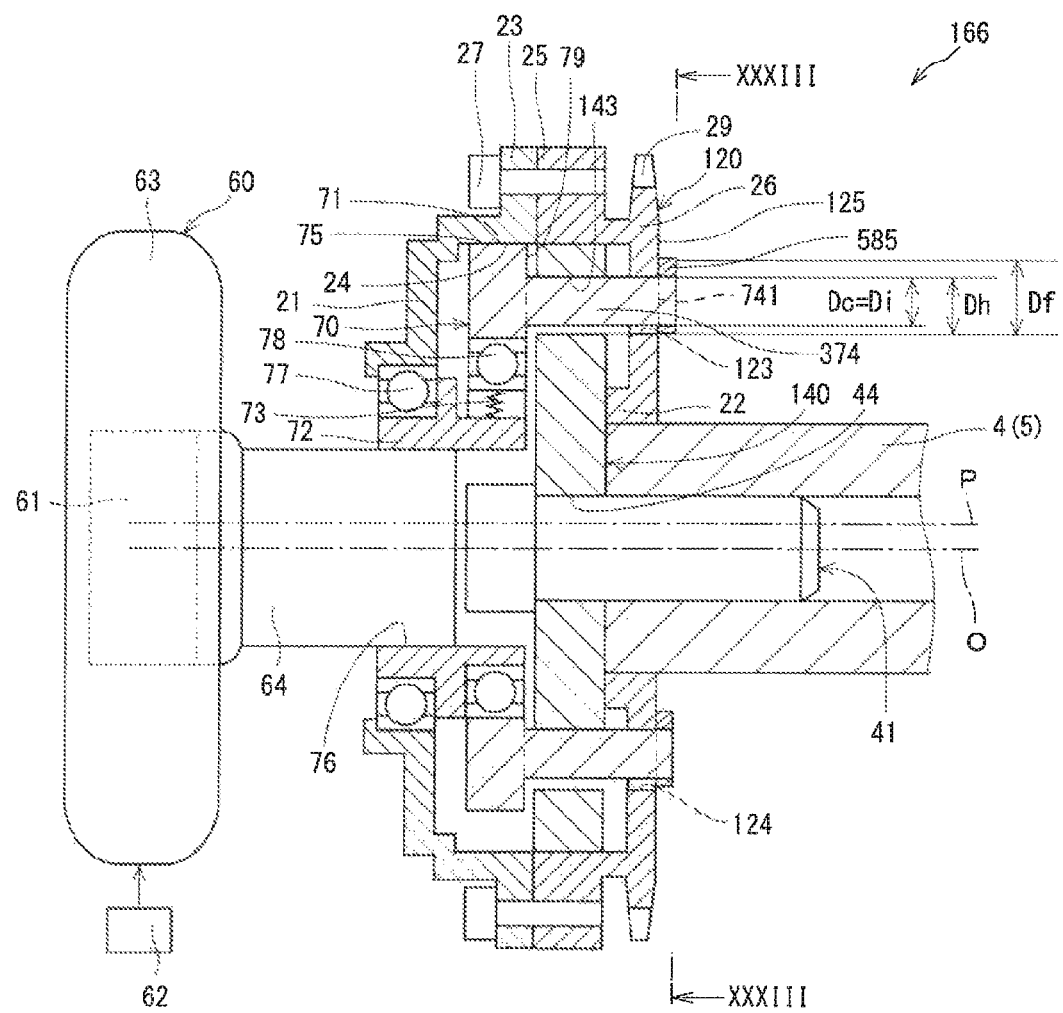
FIG. 32 is a sectional view which illustrates a modification of a cycloidal speed reducer.
Figure 33:
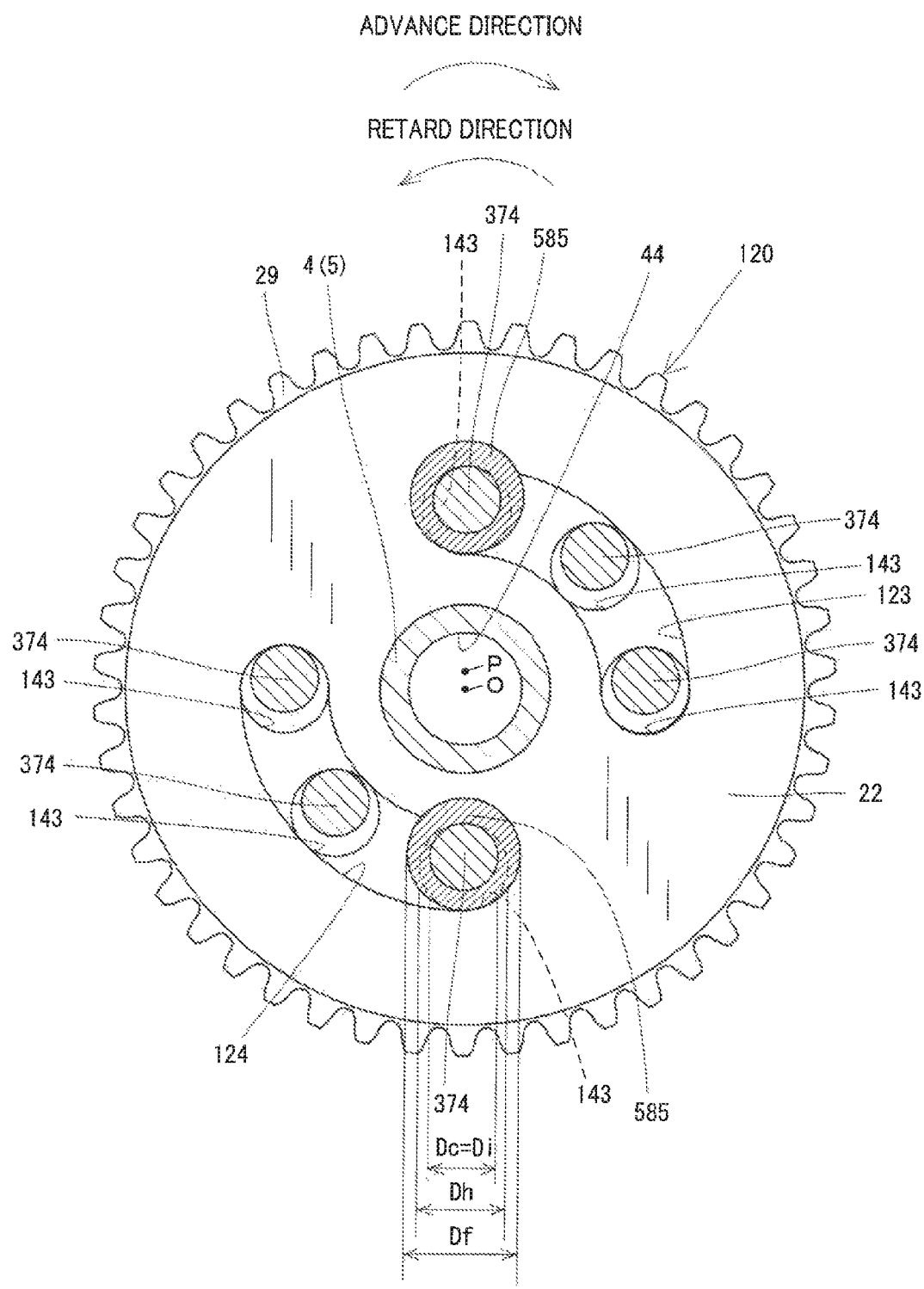
FIG. 33 is a transverse sectional view, as taken along the line XXXIII-XXXIII in FIG. 32.

FIGS. 32 and 33 illustrate the cycloidal speed reducer 166 which is a modification of the cycloidal speed reducer 157 of the seventh embodiment and additionally has the structural feature in the sixth embodiment shown in FIGS. 16 and 17.

The cycloidal speed reducer 166 is equipped with six cylindrical pins 374 and two flanges 585.

Each of the flanges 585 is hollow cylindrical and has an annular transverse section which has an inner diameter Di.

Each of the flanges 585 is shaped to have the inner diameter Ri which is equal to the diameter Dc of the cylindrical pins 374 (i.e., Ri=Dc).

Each of the flanges 585 is also shaped to have the outer diameter Df greater than the diameter Dh of the holes 143 (i.e., Df>Dh). Two of the cylindrical pins 374 are press fit in the flanges 585. Such a structure also offers substantially the same beneficial advantages as those in the sixth embodiment.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiment which can be embodied without departing from the principle of the invention as set forth in the appended claims.

What is claimed is:

1. An eccentric speed variator comprising:
a first rotor;
a second rotor which is disposed in the first rotor and has at least one hole formed therein;
a third rotor which is disposed in the first rotor and faces the second rotor, the third rotor joining the first rotor and the second rotor together so as to transmit rotation therebetween, the third rotor rotating about a rotation axis which is eccentric with respect to a rotation axis of the first rotor to change a relative rotation phase between the first rotor and the second rotor and to accelerate or decelerate the first rotor or the second rotor;
at least one engaging member which establishes mechanical engagement between the second rotor and the third rotor through the hole of the second rotor, the engaging member extending from the third rotor to have a first end farther away from the third rotor; and
at least one flange which is provided on the first end of the engaging member and extends at least partially outside the hole of the second rotor in a radial direction of the second rotor so as to at least partially overlap an outer wall of the second rotor, when contacting the outer wall of the second rotor, the flange serving to minimize inclination of the third rotor relative to the second rotor.

2. An eccentric speed variator as set forth in claim 1, further comprising an intermediate member disposed between the second rotor and the flange, the intermediate member having formed therein a through-hole which is aligned with the hole of the second rotor and through which the engaging member passes, and wherein when contacting the intermediate member, the flange serves to minimize the inclination of the third rotor relative to the second rotor.

3. An eccentric speed variator as set forth in claim 1, wherein when the third rotor is rotating, the engaging member is elastically deformed to urge the flange close to the second rotor.

4. An eccentric speed variator as set forth in claim 1, further comprising engaging members which establish mechanical engagement between the second rotor and the third rotor, and wherein the flange is secured to ends of the engaging members.

5. An eccentric speed variator as set forth in claim 1, wherein the flange is shaped to have a dimension which is greater than a diameter of the hole of the second rotor in a radial direction of the second rotor.

6. An eccentric speed variator as set forth in claim 1, wherein the flange has an annular transverse section.

7. An eccentric speed variator as set forth in claim 1, further comprising engaging members which establish mechanical engagement between the second rotor and the third rotor, the engaging members extending from the third rotor to have first ends farther away from the third rotor, and wherein the flange is secured to three or more of the first ends of the engaging members which are arranged in misalignment with each other.

8. An eccentric speed variator comprising:
a first rotor which has at least one through-hole formed therein;
a second rotor which is disposed in the first rotor and has at least one hole formed therein;
a third rotor which is disposed in the first rotor and faces the second rotor, the third rotor joining the first rotor and the second rotor together so as to transmit rotation therebetween, the third rotor rotating about a rotation axis which is eccentric with respect to a rotation axis of the first rotor to change a relative rotation phase between the first rotor and the second rotor and to accelerate or decelerate the first rotor or the second rotor;
at least one engaging member which establishes mechanical engagement between the second rotor and the third rotor through the through-hole of the first rotor and the hole of the second rotor, the engaging member extending from the third rotor to have a first end farther away from the third rotor; and
at least one flange which is provided on the first end of the engaging member and extends at least partially outside the hole of the second rotor in a radial direction of the second rotor so as to at least partially overlap an outer wall of the second rotor, when contacting the outer wall of the second rotor, the flange serving to minimize inclination of the third rotor relative to the second rotor.

9. An eccentric speed variator as set forth in claim 8, further comprising an intermediate member disposed between the first rotor and the flange, the intermediate member having formed therein a through-hole which is aligned with the through-hole of the first rotor and the hole of the second rotor and through which the engaging member passes, and wherein when contacting the intermediate member, the flange serves to minimize the inclination of the third rotor relative to the second rotor.

10. An eccentric speed variator as set forth in claim 8, wherein when the third rotor is rotating, the engaging member is elastically deformed to urge the flange close to the second rotor.

11. An eccentric speed variator as set forth in claim 8, further comprising engaging members which establish mechanical engagement between the second rotor and the third rotor, and wherein the flange is secured to ends of the engaging members.

12. An eccentric speed variator as set forth in claim 8, wherein the flange is shaped to have a dimension which is greater than a diameter of the hole of the second rotor in a radial direction of the second rotor.

13. An eccentric speed variator as set forth in claim 8, wherein the flange has an annular transverse section.

\* \* \* \* \*